US006909205B2

(12) United States Patent
Corcoran et al.

(10) Patent No.: US 6,909,205 B2
(45) Date of Patent: *Jun. 21, 2005

(54) MOTOR ASSEMBLY ALLOWING OUTPUT IN MULTIPLE DEGREES OF FREEDOM

(75) Inventors: Christopher J. Corcoran, Newton, MA (US); Richard R. Fontana, Cape Elizabeth, ME (US)

(73) Assignee: Engineering Matters, Inc., Newton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/668,910

(22) Filed: Sep. 23, 2003

(65) Prior Publication Data

US 2004/0124717 A1 Jul. 1, 2004

Related U.S. Application Data

(63) Continuation of application No. 09/953,662, filed on Sep. 18, 2001, now Pat. No. 6,664,666, which is a continuation-in-part of application No. 09/470,077, filed on Dec. 22, 1999, now Pat. No. 6,320,284.

(51) Int. Cl.$^7$ ............................................. H02K 41/00
(52) U.S. Cl. ........................... 310/12; 345/161; 341/27; 74/471 XY
(58) Field of Search .................... 74/471 XY; 345/161; 700/85; 463/38; 310/12, 15, 17, 216, 254, 259

(56) References Cited

U.S. PATENT DOCUMENTS

| | | | |
|---|---|---|---|
| 4,080,724 A | 3/1978 | Gillette | 29/598 |
| 4,161,726 A | 7/1979 | Burson et al. | 341/9 |
| 4,352,646 A | 10/1982 | Laing et al. | 417/420 |

(Continued)

FOREIGN PATENT DOCUMENTS

JP     362221856 A  *  9/1987  .......... H02K/33/16

OTHER PUBLICATIONS

US 5,903,456, 5/1999, Schena et al. (withdrawn)
"Development of a Variable–Reluctance Spherical Motor" by Kok–Meng Lee and Xiao–an Wang, Proceedings of the 18th NSF Grantees Conference of Design and Manufacturing System Research, Atlanta, Georgia, Jan. 8–12, 1992.
"Automated Adaptive Control of Display Characteristics Within Future Air Force Crew Stations" Haas, et al. Proc. of Amer. Control Conference 1998; vol. 1 Air Force Res. Lab., Wright Patterson AFB, OH, USA; pp. 450–452 Month Unknown.
Biodynamic and Spasticity Reduction in Joystick Control via Force Reflection Repperger Sep. 1995; AD–A313 739, AL/CR–TR–1995–0152 Armstrong Laboratory, Air Force Material Command, Wright Patterson AFB, OH; pp. 1–23.

(Continued)

*Primary Examiner*—Darren Schuberg
*Assistant Examiner*—Judson H. Jones
(74) *Attorney, Agent, or Firm*—Hayes Soloway PC

(57) ABSTRACT

A motor allowing multiple degrees of output freedom includes a stator having an interior surface forming at least a portion of a sphere or curved surface and first and second substantially orthogonally positioned stator coils wound on the interior surface. A rotor is fixed to an output shaft and movably supported adjacent the stator with an air gap disposed between the rotor and the stator. The rotor includes a plurality of magnets disposed thereon and is movable along the interior surface in directions defining at least first and second degrees of freedom. Upon energization of the first stator coil, a first magnetic field is established to urge at least a first one of the magnets and the rotor in a direction of the first degree of freedom and upon energization of the second stator coil, a second magnetic field is established to urge at least a second one of the magnets and the rotor in a direction of the second degree of freedom.

47 Claims, 19 Drawing Sheets

U.S. PATENT DOCUMENTS

| | | | | |
|---|---|---|---|---|
| 4,375,631 A | | 3/1983 | Goldberg | 338/128 |
| 4,477,043 A | | 10/1984 | Repperger | 244/223 |
| 4,533,827 A | | 8/1985 | Fincher | 250/214 PR |
| 4,560,983 A | | 12/1985 | Williams | 340/825 |
| 4,590,339 A | | 5/1986 | Scott-Jackson et al. | 200/6 A |
| 4,607,197 A | | 8/1986 | Conrad | 318/116 |
| 4,632,341 A | | 12/1986 | Repperger et al. | 244/230 |
| 4,642,595 A | | 2/1987 | Ruumpol | 336/135 |
| 4,719,381 A | * | 1/1988 | Miles | 310/166 |
| 4,739,241 A | | 4/1988 | Vachtsevanos et al. | 318/568.19 |
| 4,745,367 A | | 5/1988 | Dustmann et al. | 315/305 |
| 4,763,034 A | | 8/1988 | Gamble | 310/181 |
| 4,842,607 A | | 6/1989 | Repperger et al. | 623/24 |
| 4,855,704 A | | 8/1989 | Betz | 336/132 |
| 4,908,558 A | * | 3/1990 | Lordo et al. | 318/648 |
| 4,945,367 A | | 7/1990 | Blackshear | 396/427 |
| 5,044,956 A | | 9/1991 | Behensky et al. | 434/45 |
| 5,062,594 A | | 11/1991 | Repperger | 244/175 |
| 5,107,080 A | | 4/1992 | Rosen | 200/6 A |
| 5,111,288 A | | 5/1992 | Blackshear | 348/143 |
| 5,196,745 A | * | 3/1993 | Trumper | 310/12 |
| 5,319,577 A | | 6/1994 | Lee | 702/153 |
| 5,328,166 A | | 7/1994 | Hokamura | 271/171 |
| 5,349,881 A | | 9/1994 | Olorenshaw et al. | 74/471 XY |
| 5,382,860 A | * | 1/1995 | Fanning et al. | 310/216 |
| 5,402,049 A | | 3/1995 | Lee et al. | 318/568.1 |
| 5,410,232 A | | 4/1995 | Lee | 318/568.11 |
| 5,416,392 A | | 5/1995 | Lee et al. | 318/568.1 |
| 5,421,694 A | | 6/1995 | Baker et al. | 414/694 |
| 5,491,462 A | | 2/1996 | Cecchi et al. | 338/128 |
| 5,503,040 A | | 4/1996 | Wright | 74/471 XY |
| 5,589,854 A | | 12/1996 | Tsai | 345/161 |
| 5,619,195 A | | 4/1997 | Allen et al. | 341/20 |
| 5,643,087 A | | 7/1997 | Marcus et al. | 463/38 |
| 5,689,670 A | | 11/1997 | Luk | 712/207 |
| 5,691,898 A | | 11/1997 | Rosenberg et al. | 700/85 |
| 5,703,604 A | | 12/1997 | McCutchen | 345/8 |
| 5,709,219 A | | 1/1998 | Chen et al. | 600/595 |
| 5,719,451 A | | 2/1998 | Cook et al. | 310/12 |
| 5,721,566 A | | 2/1998 | Rosenberg et al. | 345/161 |
| 5,731,804 A | | 3/1998 | Rosenberg | 345/156 |
| 5,734,373 A | | 3/1998 | Rosenberg et al. | 345/161 |
| 5,739,811 A | | 4/1998 | Rosenberg et al. | 345/161 |
| 5,767,839 A | | 6/1998 | Rosenberg | 345/161 |
| 5,773,773 A | | 6/1998 | McCauley et al. | 200/6 A |
| 5,805,140 A | | 9/1998 | Rosenberg et al. | 345/161 |
| 5,825,308 A | | 10/1998 | Rosenberg | 341/20 |
| 5,831,554 A | | 11/1998 | Hedayat et al. | 341/20 |
| 5,831,596 A | | 11/1998 | Marshal et al. | 345/161 |
| 5,929,607 A | | 7/1999 | Rosenberg et al. | 320/166 |
| 5,929,846 A | | 7/1999 | Rosenberg et al. | 345/161 |
| 5,942,832 A | | 8/1999 | Oudet | 310/254 |
| 5,969,520 A | | 10/1999 | Schottler | 324/207.2 |
| 6,004,134 A | * | 12/1999 | Marcus et al. | 434/45 |
| 6,153,951 A | | 11/2000 | Morita et al. | 310/12 |
| 6,259,174 B1 | | 7/2001 | Ono | 310/13 |

OTHER PUBLICATIONS

"Why the Pentagon is Often Slow to Pursue Promising New Weapons", Ricks *Wall Street Journal*; Oct. 12, 1999, pp. 1–9.

"Urban Warfare: Where Innovation Hasn't Helped", Ricks—*Wall Street Journal*; Oct. 12, 1999, pp. 1–3.

"A Test of Fitts' Law in Two Dimensions with Head and Head Movement", R. Jagacinski, et al. AD–A133 347, AFAMRL–TR–83/054, Wright Patterson AFB, OH, Jul. 1983; pp. 1–23.

"Effects of Different Control Mechanism Upon Use of a Training Device," Schlechter. AD–A212 979, US Army, Fort Knox, KY, Jul. 1989; pp. 1–18.

"Sims Aims High", Electronic Design, Penton Media, Hasbrouck Heights, NJ, Aug. 23, 1999; p. 32 B.

"A study of Adaptive Stick Controller in Human Interface Systems" Repperger, et al. Proc. of Amer. Control Conference 1998; vol. 1, Air Force Res. Lab, Wright Patterson AFB, OH, pp. 453–455. Month unknown.

* cited by examiner

MOTOR ASSEMBLY ALLOWING OUTPUT IN MULTIPLE DEGREES OF FREEDOM

CROSS-REFERENCE TO RELATED APPLICATIONS

The present application is a continuation application of U.S. patent application Ser. No. 09/953,662 filed Sep. 18, 2001 now U.S. Pat. No. 6,664,666, which is a continuation-in-part of U.S. patent application Ser. No. 09/470,077 filed Dec. 22, 1999, now U.S. Pat. No. 6,320,284, both entitled "Motor Assembly Allowing Output in Multiple Degrees of Freedom," the teachings of these applications are incorporated herein by reference in their entirety U.S. application Ser. No. 09/953,662 is also a continuation in part of provisional application No. 60/286,894 filed Apr. 27, 2001, which is incorporated herein by reference in its entirety. This application claims benefit of PCT/US02/13859 filed May 3, 2002, which is incorporated herein by reference in its entirety.

STATEMENT REGARDNG FEDERALLY SPONSORED RESEARCH OR DEVELOPMENT

The government has a paid-up license in this invention and the right in limited circumstances to require the patent owner to license others on reasonable terms as provided for by the terms of contract F33615-00-C-6009 awarded by U.S. Air Force.

FIELD OF THE INVENTION

The present invention relates in general to a motor assembly, and in particular to a force feedback motor assembly that provides an output in one or more degrees of freedom for use in joystick and other applications and more particularly to an improved force feedback joystick.

BACKGROUND OF THE INVENTION

Various force feedback motor designs providing multiple degrees of freedom are known in the art for use in a wide variety of applications. For example, multiple degrees of freedom in motor output are particularly useful in linear actuation and positioning applications. Another application in which such motors may be used is in joystick applications for real control of an associated apparatus, e.g., direct control of an aircraft, wheelchair, or other vehicle, or for simulation apparatus control, e.g. video games, flight simulation, virtual reality simulation, etc. In these applications a control system may be provided for sensing a user's manipulation of a joystick, i.e., the motor output shaft, and providing a signal for controlling the application.

Many applications also require force or tactile ("haptic") feedback to the user. The need for the user to obtain realistic tactile information and experience tactile sensation is extensive in many kinds of simulation and other applications. For example, in medical/surgical simulations, the "feel" of a probe or scalpel simulator is important as the probe is moved within the simulated body. It would be invaluable to a medical trainee to learn how an instrument moves within a body, how much force is required depending on the operation performed, the space available in a body to manipulate an instrument, etc. In simulations of vehicles or equipment, force feedback for controls such as a joystick can be necessary to realistically teach a user the force required to move the joystick when steering in specific situations, such as in a high acceleration environment of an aircraft. Alternatively, when actually operating in a high acceleration vehicle environment, the force feedback can be used to counteract the effect of the acceleration induced forces on the hand and thus improve controllability and safety of the vehicle. In virtual world simulations where the user can manipulate objects, force feedback is necessary to realistically simulate physical objects; for example, if a user touches a pen to a table, the user should feel the impact of the pen on the table. An effective human/computer interface, such as a joystick, not only acts as an input device for tracking motion, but also as an output device for producing realistic tactile sensations. An interface that accurately responds to signals having fast changes and a broad range of frequencies as well as providing such signals accurately to a control system, is therefore desirable in these and other applications.

In addition, there is a desire to provide force feedback to users of computer systems in the entertainment industry. Joysticks and other interface devices can be used to provide force feedback to a user playing a video game or experiencing a simulation for entertainment purposes. Through such an interface device, a computer system can convey to the user the physical sensation of colliding into a wall, moving through a liquid, driving over a bumpy road, and other sensations. The user can thus experience an entire sensory dimension in the gaming experience that was previously absent. Force feedback interfaces can provide a whole new modality for human-computer interaction.

In typical multi-degree of freedom apparatuses that are capable of providing force feedback, there are several disadvantages. Generally conventional devices are cumbersome and complex mechanisms that are difficult and expensive to manufacture. In particular, the use of a transmission between the actuator motor and the joystick reduces the performance of the device and reduces the reliability and life of the device. Many transmission types can fail in a manner that renders the device unusable. For industrial and military applications, reliability and maintenance concerns are sometimes linked to the safety of personnel. If a force feedback device is not reliable or failsafe, then its use in these applications may be restricted or prevented even though the force feedback capability would enhance the performance and safety for that application.

In consumer markets, low-cost is highly desirable. For example, personal computers for the home consumer are becoming powerful and fast enough to provide force feedback to the typical mass-market consumer. A need is thus arising to be able to manufacture and market force feedback interfaces as cheaply and as efficiently as possible. The cost, complexity, reliability, and size of a force feedback interface for home use should be practical enough to mass-produce the devices. In addition, aesthetic concerns such as compactness and operating noise level of a force feedback device are of concern in the home market. Since the prior art feedback interfaces are mainly addressed to specific applications in industry, most force feedback mechanisms are costly, large, heavy, are easily broken, have significant power requirements, and are difficult to program for applications. The prior art devices require high-speed control signals from a controlling computer for stability, which usually requires more expensive and complex electronics. In addition, the prior art devices are typically large and noisy. These factors provide many obstacles to the would-be manufacturer of force-feedback interfaces to the home computer market.

Accordingly, there is a need in the art for a reliable motor allowing output in multiple degrees of freedom and capable of providing force feedback that may be efficiently and cost-effectively produced.

SUMMARY OF THE INVENTION

The present invention is organized about the concept of providing a reliable and cost-efficient force feedback motor allowing multiple degrees of output freedom. In particular, a force feedback motor consistent with the invention may include: a stator having an interior surface forming at least a portion of a sphere or curved surface and first and second substantially orthogonally positioned stator coils wound on the interior (or exterior) surface; and a rotor fixed to the output shaft and movably supported adjacent the stator with an air gap disposed between the rotor and the stator, the rotor including one or a plurality of magnetic field generators disposed thereon and being movable along the interior surface in directions defining at least first and second degrees of freedom. Upon energization of the first stator coil, a first magnetic field is established to force at least a first one of the magnets and the rotor in a direction in the first degree of freedom. Upon energization of the second stator coil, a second magnetic field is established to force at least a second one of the magnets and the rotor in a direction in the second degree of freedom. The first degree of freedom may be parallel to the second stator coil and the second degree of freedom may be parallel to the first stator coil.

The interior surface of the stator may be defined by a stator back iron comprising a ferromagnetic material. Each of the rotor magnets may also be arranged on a rotor back iron comprising a ferromagnetic material. The rotor magnets may be permanent magnets or electromagnets.

The rotor magnets may be arranged to form different sides of a parallelogram, with first and second ones of the magnets defining a first pair of parallel sides of the parallelogram parallel to the first stator coil, and third and fourth ones of the magnets defining a second pair of parallel sides of the parallelogram parallel to the second stator coil. The parallelogram defined by the magnets may be a square. Also, the first and third ones of the magnets advantageously may be configured with north poles disposed adjacent the stator coils, and the second and fourth ones of the magnets are configured with south poles disposed adjacent the stator coils.

The rotor may be supported adjacent the stator by a gimbal mechanism connected to the output shaft, e.g., a joystick handle, and supported on the stator. The gimbal mechanism may be configured to establish pivot points for the output shaft to allow motion of the rotor in the first and second degrees for freedom, the pivot points being substantially aligned with an equator of the sphere or curved surface.

According to the invention, there is also provided a method of providing force feedback to the joystick handle in response to manipulation of the handle by a user. The method includes: providing a motor consistent with the invention with the joystick being the output shaft; sensing a position of the joystick; energizing at least one of the coils based on the position to establish the feedback force against at least the first one of the magnets and the rotor.

It is an object of the present invention to provide a motor having an output shaft movable in multiple degrees of freedom. The motor comprising a stator and a rotor. The stator having an interior surface with first and second stator coils wound thereon, wherein the stator coils are positioned substantially orthogonally to each other. The rotor being fixed to the output shaft and movably supported adjacent the stator with an air gap disposed between the rotor and the stator, the rotor including at least one magnet disposed thereon and being movable along the interior surface in directions defining at least first and second degrees of freedom, wherein upon energization of the first stator coil, a first magnetic field is established to urge the rotor to rotate in a direction of the first degree of freedom, and upon energization of the second stator coil, a second magnetic field is established to urge the rotor to rotate in a direction of the second degree of freedom, the second degree of freedom substantially perpendicular to the first degree of freedom.

It is a further object of the invention to provide a motor having an output shaft movable in multiple degrees of freedom. The motor comprising a stator and a rotor. The stator having an interior surface and first and second stator coils wound in close proximity to the interior surface. The stator coils being positioned substantially orthogonally to each other. The stator comprising a plurality of laminations radially disposed about a center point with a plane of each lamination extending through the center point. The rotor being fixed to the output shaft and movably supported adjacent the stator with an air gap disposed between the rotor and the stator. The rotor including at least one magnet disposed thereon and being movable along the interior surface in directions defining at least first and second degrees of freedom.

It is a further object of the invention to provide a motor having an output shaft movable in multiple degrees of freedom. The motor comprising a stator and a rotor. The stator having an interior surface and first and second stator coils wound in close proximity to the interior surface. The stator coils positioned substantially orthogonally to each other. The stator comprising a first plurality and a second plurality of parallel laminations arranged in an arc about a center point, the first plurality arranged perpendicular to the second plurality. The rotor being fixed to the output shaft and movably supported adjacent the stator with an air gap disposed between the rotor and the stator. The rotor further comprising at least one magnet disposed thereon and being movable along the interior surface in directions defining at least first and second degrees of freedom.

It is a further object of the invention to provide a motor having an output shaft movable in multiple degrees of freedom. The motor comprising a stator and a rotor. The stator having an interior surface and first and second stator coils wound in close proximity to the interior surface. The stator coils positioned substantially orthogonally to each other. The stator comprising a first plurality and a second plurality laminations arranged in an arc about a center point, the first plurality arranged perpendicular to the second plurality. The rotor fixed to the output shaft. The rotor comprising a cross linkage having a first arm extending radially from the output shaft and a second arm extending radially from the output shaft with the first arm fixed to and orthogonal to the second arm. The rotor further comprising a first permanent magnet disposed at a distal end of the first arm and a second permanent magnet disposed at a distal end of the second arm. The first and the second magnets movably supported adjacent along the interior surface of the stator in directions defining at least first and second degrees of freedom.

It is a further object of the invention to provide a lamination for use in a stator. The lamination comprising a ferromagnetic material having an arcuate surface orthogonal to a side surface and a plurality of parallel slots.

BRIEF DESCRIPTION OF THE DRAWINGS

For a better understanding of the present invention, together with other objects, features and advantages, reference should be made to the following detailed description which should be read in conjunction with the following figures wherein like numerals represent like parts, and wherein.

DETAILED DESCRIPTION OF THE INVENTION

Figure 1:
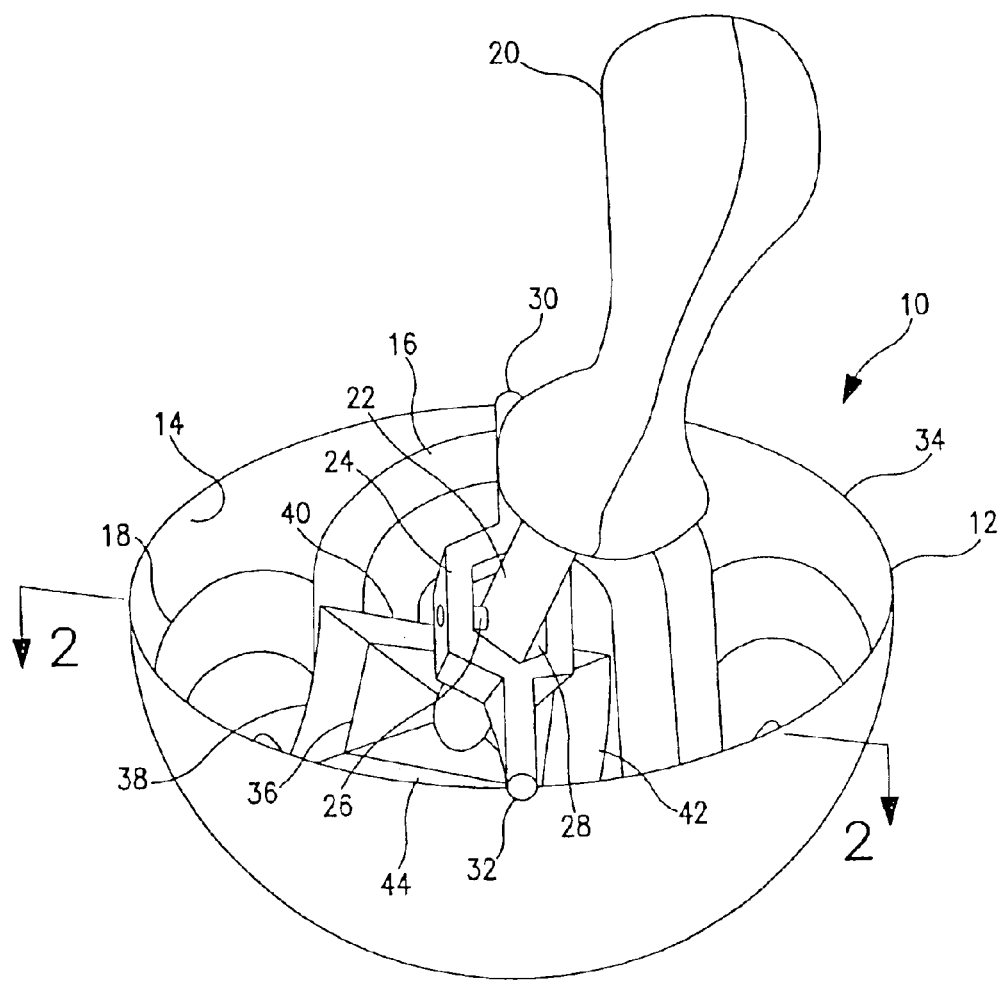
FIG. 1: is an isometric view of a first exemplary embodiment of a motor assembly consistent with the invention in a joystick application.

With reference now to FIG. 1, there is shown an exemplary embodiment of a motor assembly 10 consistent with the invention. In the illustrated embodiment, the assembly 10 is configured for operation as a joystick, which may provide force feedback to a user through the joystick handle. However, a motor assembly 10 consistent with the invention may be used in a wide variety of applications. The descriptions provided herein relate to use of an assembly in a joystick configuration are provided, therefore, by way of illustration but not of limitation.

As shown, the exemplary embodiment of FIG. 1 generally includes a curved surface, hemisphere, or truncated sphere 12 of ferromagnetic material which will be simply referred to as the sphere for the purposes of discussion, but in reality may be nonspherical, which is lined on the interior 14 with coils 16 and 18 configured to carry electrical current provided from a power supply (not shown). In the illustrated embodiment the coils 16, 18 are substantially orthogonal to each other. In a joystick application, as shown, a moving joystick handle 20 has a shaft 22 extending from a bottom thereof. The shaft 22 is attached to a bar 24 by a pivot 26 so that the shaft may pivot within an opening 28 in the bar 24 about the pivot 26. The bar 24 has first 30 and second 32 ends which are pivotally supported relative to the sphere, e.g. on an upper edge 34 of the sphere 12 as shown. The described system of constraint serves as a simple embodiment. It is to be understood, however, that a variety of means for constraining the moving components to the desired degrees of freedom may be employed.

The bar thus acts as a gimbal, and the position of the shaft 22 can be sensed by sensing the rotation of the ends 32 or 30 and the pivot pin 26. A variety of means for sensing the rotational position of these elements, and therefore determining the position of the shaft 22 may be employed. However, for cost and simplicity considerations, however, it has been found that potentiometers may be coupled to the shafts to provide varying resistance depending on the position of the shaft. A control application can provide an output signal that varies according to the resistance provided by the potentiometers so that the output of the application is related in a known manner to the position of the shaft. It is to be understood, however, that a variety of means for providing shaft position information may be employed.

The end of the shaft distal from the handle 20 has a ferromagnetic back iron 36 rigidly affixed thereto. The back iron 36 has one or a plurality of magnets affixed thereto. The magnets may be permanent magnets or electromagnets. In the illustrated embodiment the magnets 38, 40, 42 and 44 are arranged to form a square pattern with their edges substantially parallel with and perpendicular to the coils 16, 18. Although the square configuration is preferable, it is possible to arrange the magnets in any parallelogram configuration.

The bar 24 and the pivot mechanism formed thereby maintains an air gap between the magnets 38, 40, 42, 44, and the coils 16, 18. Energization of one or more of the coils produces a force upon corresponding ones of the magnets in either of the two axes perpendicular to the wires in the coils. Advantageously, therefore, the coils may be selectively energized, e.g. in dependence of a control algorithm provided by a user application such as a video game or simulation device or based on the position of the joystick, to provide a force output to the user through the handle 20. Thus configured, the assembly 10 can be considered to include a stator defined by the coils on the sphere (or curved surface) 12 and a rotor defined by the magnets 38, 40, 42 and 44 positioned on the end of the shaft 22.

Figure 2:
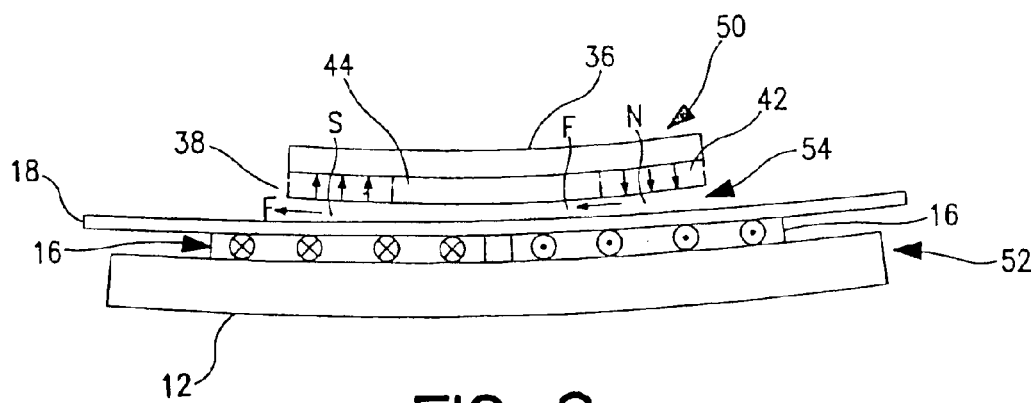
FIG. 2: is a partial sectional view of the motor assembly shown in FIG. 1 taken along lines 2—2.

Turning now to FIG. 2, there is provided a partial sectional view of the assembly of FIG. 1 wherein the orientation of the rotor 50 and the stator 52 are more particularly shown. As illustrated, the gimbal mechanism provided by the bar 24 maintains an air gap 54 between the rotor 50 and the stator 52. The air gap 54 may have a constant width, or may have a width that varies with rotation of the handle, depending on the application.

In the illustrated embodiment two degrees of freedom are achieved. The degrees of freedom represent two orthogonal coordinates similar to the x and y axis in a Cartesian coordinate system, i.e. the standard θ and φ of spherical geometry. One degree of freedom may be considered "left to right" movement in FIG. 2, and another degree of freedom may be movement into and out of the page in FIG. 2.

Torque is created at the output of the motor, e.g. the handle 20, by selectively energizing the windings using an internal or external power supply. In the embodiment illustrated in FIG. 2, electrical current runs into and out of the page in the lower coil 16. The lower coil 16 is used for actuation left-to-right, i.e., lateral movement, producing a roll rotation direction.

In the upper coil 18, which is positioned immediately above the lower coil, electrical current runs to the left and right of the page. The coil 18 is used for actuation of the motor into and out of the page. The positive electrical current in this coil travels from left-to-right in the leg of the coil shown in FIG. 2, and right to left on the far side of the coil, which is not shown in FIG. 2. The actuation for force (torque) into and out-of the page is achieved using the magnets 40, 44. The into- and out-of-page motion produces a pitch rotation in a joystick application.

The angles and sizes of the coils 16, 18 can be adjusted to provide different force capabilities in pitch and roll if desired. Additionally, the pitch and roll axes can be arranged at a 45-degree angle to the coils if desired. This requires a controller to mix the currents to the pair of coils to drive one axis, but may improve manufacturability by allowing the end turns to easily clear the gimbal pivots. Any angles of coils for the two axis can be used to provide any desired angles of actuation by controlling the current to each coil such that the net force produced (the vector sum of the forces) is in the desired direction. This remapping of the forces can be performed by the electronics and/or a computer and may allow a less expensive embodiment to perform a desired task. The substantially orthogonal coil arrangement is the preferred embodiment since it reduces the complexity of the control system.

The coils can be wound using standard winding techniques for copper coils. Generally it is easier to wind the coils on a flat surface. However, if a curved geometry is used, as shown in FIGS. 1 and 2, the windings may be press-fit or heated then press-fit to the desired shape. The windings may also be wound between curved forming plates (not shown), or wound directly onto a form. Also, the windings may be wound so that their positions are adjustable to allow for user adjustment or re-mapping of the motor degrees of freedom. If desired, the stator iron 12 can be formed with teeth in the form of pins and the coils can be laid in the notches between the teeth. This is useful for reducing the magnet size required, but makes manufacturing more complex.

The back iron 36 may be fabricated using laminations in order to achieve improved frequency response operation and reduce eddy current heating losses. Lamination stock of suitable thickness for high frequency response is commercially available from numerous commercial vendors. Also, the magnets 38, 40, 42 and 44 may be provided as permanent magnets, as shown due to the cost and performance considerations.

In operation, the permanent magnets create magnetic flux, B, which couples through the current, I, in the stator windings (or coils) of active length, L. This creates a force (or torque, if a rotational geometry is used) according to the Lorentz force law, $F=I \times L \times B$, $T=r \times F$, which pushes the rotor to the left if the polarity of the currents and permanent magnets are as shown.

Figure 3:
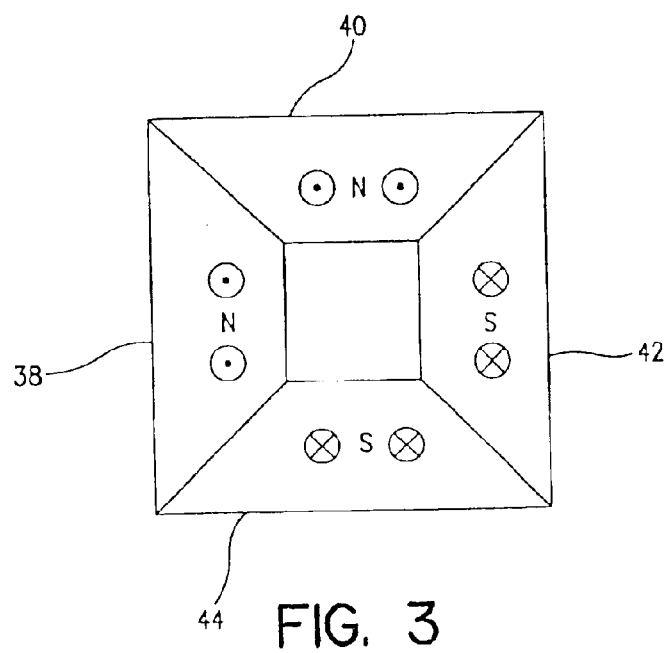
FIG. 3: is a top view of an exemplary rotor magnet assembly for a motor consistent with the invention.
Figure 4:
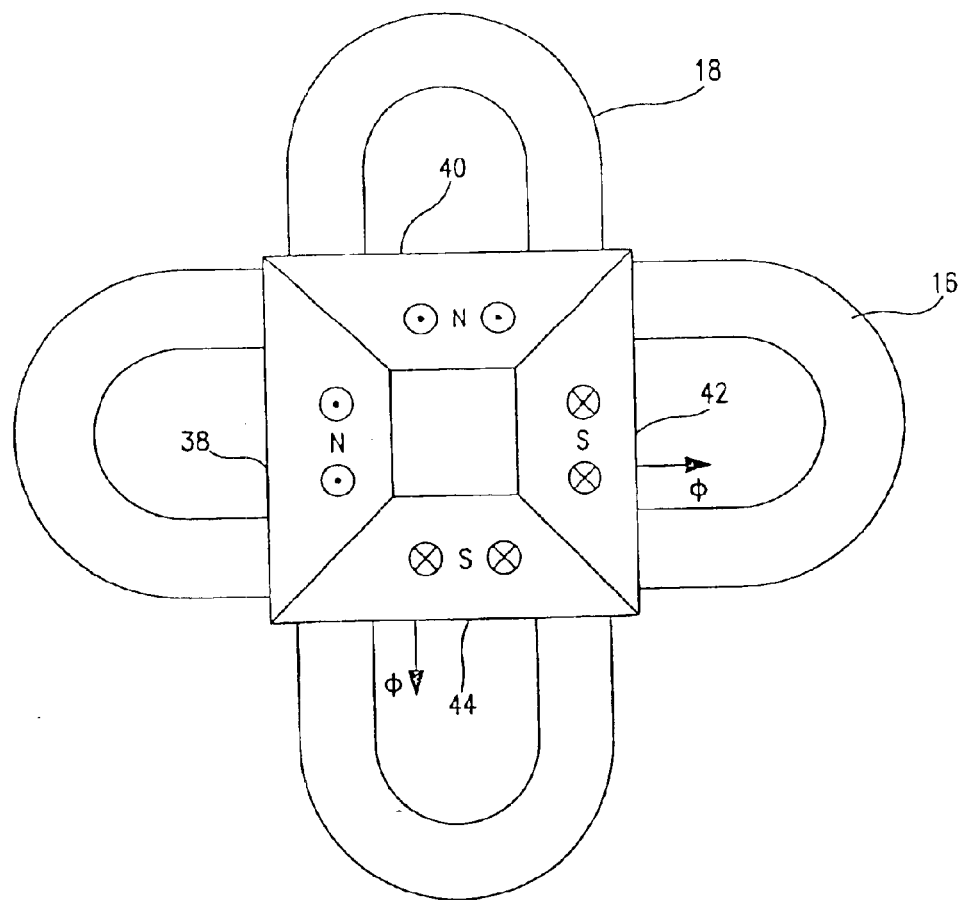
FIG. 4: is a top view of the motor magnet assembly of FIG. 1 and stator coil assembly for a motor consistent with the invention.

A top view of the complete set of rotor magnets is shown in FIG. 3. The coils 16, 18 are omitted from FIG. 3 for clarity. When the illustrated magnet array is overlaid on top of the coils 16, 18, the arrangement is shown in FIG. 4. For clarity of viewing, the back irons have been omitted from FIG. 4. Four magnets utilized in this exemplary embodiment with polarities as shown.

As used herein, "N" represents the north pole and "S" represents the south pole of a magnet or electromagnet. Thus, in the illustrated embodiment first 38 and second 40 magnets forming adjacent sides of the square (or parallelogram) configuration are configured with south poles disposed adjacent the coils, i.e. north poles shown in the top view of FIG. 4. Third 42 and fourth 44 magnets forming remaining adjacent sides of the square rotor magnet configuration are configured with north poles disposed adjacent the coils, i.e. south poles shown in the top view of FIG. 4. Although use of back iron is not necessary for motor operation, the back iron 36, 12 in the rotor and stator, respectively, is used to efficiently couple the magnetic flux through the magnetic circuit and create a high force in the motor.

The electrical windings are shown as single coils 16, 18 that are perpendicular to each other to achieve actuation in both the lateral θ and the "fore-aft" φ directions. In this view, it can be seen that energization of the θ coil 18 will result in a force (torque) to the left while producing no force in the φ direction. This is due to illustrated unique coil and permanent magnet arrangement. Likewise, energization of the φ coil 16 will result in a force (torque) upward (in this view) while producing no force in the θ direction.

Figure 5:
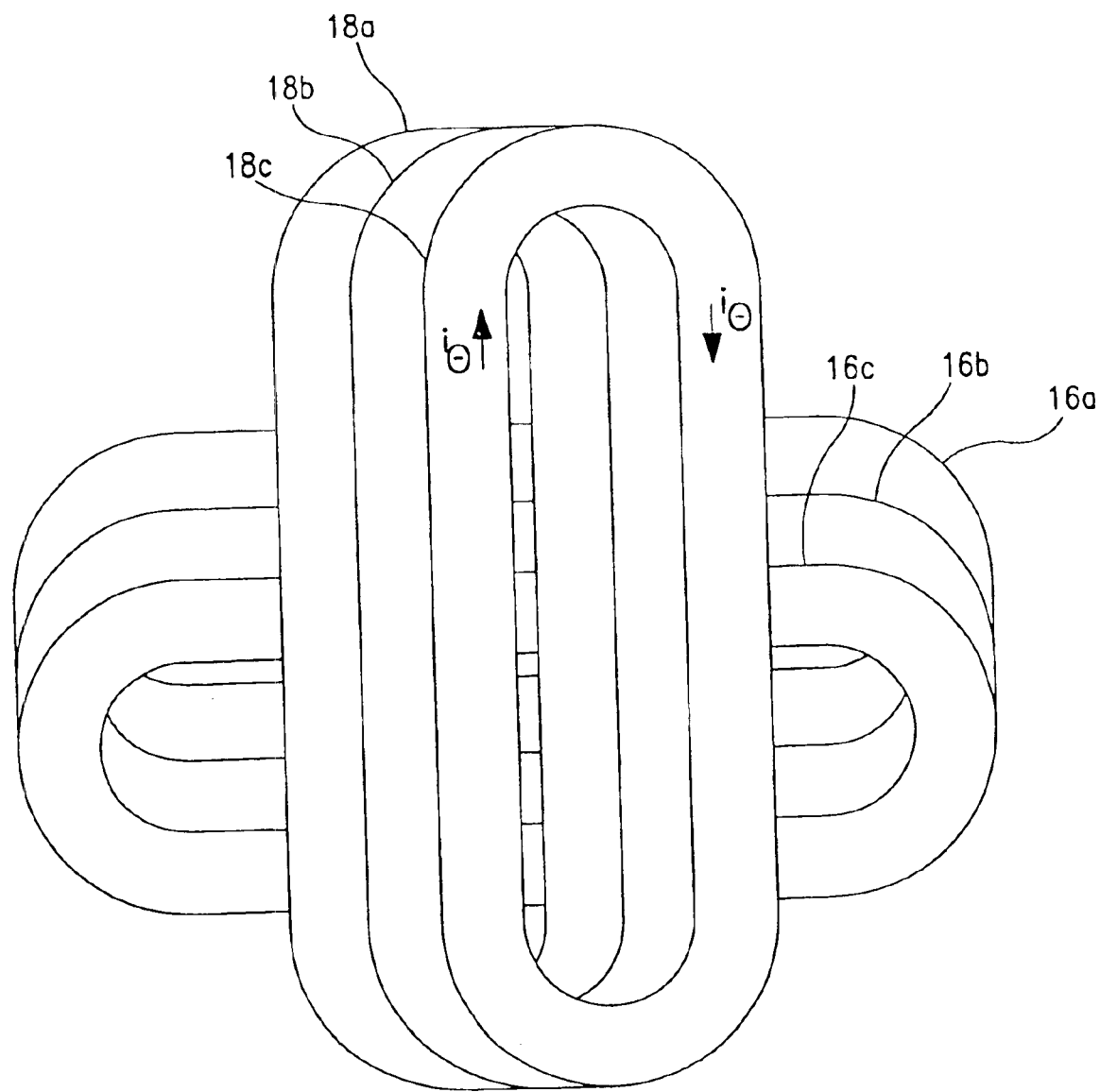
FIG. 5: is a top view of an exemplary polyphase stator coil assembly for a motor consistent with the invention.

The embodiment in FIG. 4 is illustrated using a single pair of coils 16, 18 for simplicity. However, it also is possible to design the motor using a 3-phase (or any other number of phases) set of windings. In FIG. 5, for example, there is shown the coil windings for a polyphase embodiment. The rotor magnet array is not shown in FIG. 5 for simplicity. In this coil arrangement, energizing only the coils that are under the magnets during rotation of the rotor can reduce the power requirements and heating. Many standard coil-winding options are possible. The illustrated embodiment is, however, suitable for the limited-throw case (i.e., restricted angular movement) where the right side magnet never passes over the left side of the coils.

Figure 6:
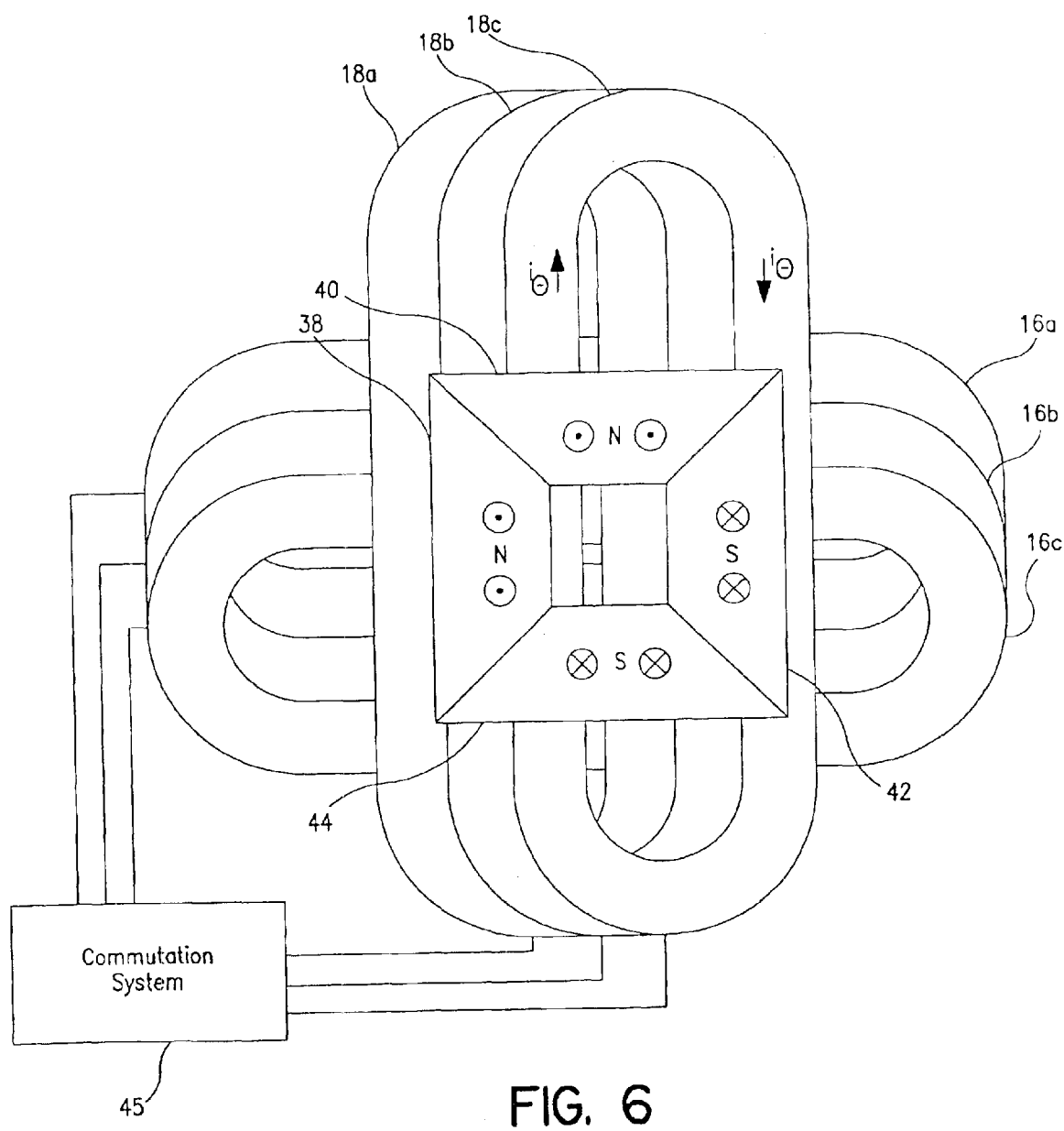
FIG. 6: is a top view of the stator coil assembly shown in FIG. 5 in position relative to the rotor magnet assembly as shown in FIG. 3.

FIG. 6 presents a view of the arrangement of FIG. 5 including the rotor magnet array. The back iron is not shown in FIG. 6 for simplicity. As shown, the conductors can be wound in the form of three independent overlapped coils 16a, 16b, 16c and 18a, 18b, 18c that can be driven with a three-phase power supply. As the handle 20 moves, a commutation system 45 (e.g., including sensors, controls, and power supply) changes the distribution of currents in the coils to provide a desired force at any stick position. This can produce a motor with an increased electrical efficiency. Due to the specific geometry of the design, the forces on the two axes are independently controlled with negligible cross talk or influence between axes.

In addition to the torques produced by the electrical current, a centering force can be obtained by forming the center of the sphere 12 to be slightly above the center of the stick (i.e. the handle 20 and shaft 22) rotation so that the closest approach occurs when the stick is centered. The inherent attraction of the magnets 38, 40, 42, 44 to the ferromagnetic sphere 12 will then produce a centering force.

Similarly, if the center of the sphere 12 is located below the pivot point then the magnetic force is destabilizing and drives the stick towards the edge. A bias in any direction or no bias can be achieved by controlling the location of the center of the sphere 12 in relation to the center of the gimbal pivot system. Similarly, arranging the gimbal so that the axes do not cross at a point allows a bias of one axis to be different than the other. More complex modifications of the curved or spherical surface are useful. For example a dimple pattern at the bottom center would help achieve the strong at-center centering force that many joysticks available today have. For most applications the neutral condition is the best. In the neutral configuration all the pivot centers and sphere centers meet at a common point. Thus, as an alternative to the illustrated bar gimbal, a ball joint gimbal can be used if desired.

For small displacements, the coils 16, 18 can be substantially similar, but for large displacement designs the performance is enhanced if the coils are shaped to maintain parallelism with the edges of the magnets 38, 40, 42, 44 to the greatest extent possible. For the arrangement shown, the coils 16,18 can be wound with longitude and latitude alignment for large displacements if desired.

Alternatively, the pivot points on the sphere can be rotated 45 degrees about the vertical axis while maintaining the position of the magnets 38, 40, 42, 44 and the coils 16,18 to provide a mixed axis drive. This makes more space available for the bearings and coil end turns, but requires the two coil drive control currents be properly blended to provide the desired force vector. Since the output forces for each coil are now essentially at 45 degrees to the main axes of pitch and roll and still essentially orthogonal, this control is still very easily handled by a controller with or without a mathematical look-up table.

The coils 16, 18 can be wound in layers and commutated so that only those coils most suited to producing the desired forces (those under the magnets) can be activated. Another alternative is to inset the coils in slots in the ferromagnetic sphere. This can enhance the performance by increasing the magnetic flux from the permanent magnets and reducing the effective air gap. The slots then form a grid-like pattern of pins on the sphere. It is advantageous to space these pins relative to the edges of the magnets so that the magnet motion tends to cover a constant area of pins, thus minimizing cogging. As one edge moves over new pins the other edge leaves the old pins such that the overall area remains constant. The greatest cogging force comes from the magnets seeking the lowest reluctance position, which for this design tends to be that position in which the maximum tooth areas is under the magnets, thus one goal of the design is to maintain a constant tooth area coverage to the greatest degree possible. Cogging may not, however, be an important parameter for some configurations and control schemes.

For use as a joystick, the motor may be used in either a simulator application (in which the user controls a simulated device such as a computer game or a flight simulator) or a real control application where the user is either controlling a machine, vehicle or other such device. In addition, it will be recognized that the motor can be used for a variety of positioning tasks, for example, the motor could be used as a mirror control for precise angular control about two axis of rotation can be achieved with this motor. The control for these two applications can be arranged as conceptually shown below in block diagram form in FIGS. 7 and 8.

Figure 7:
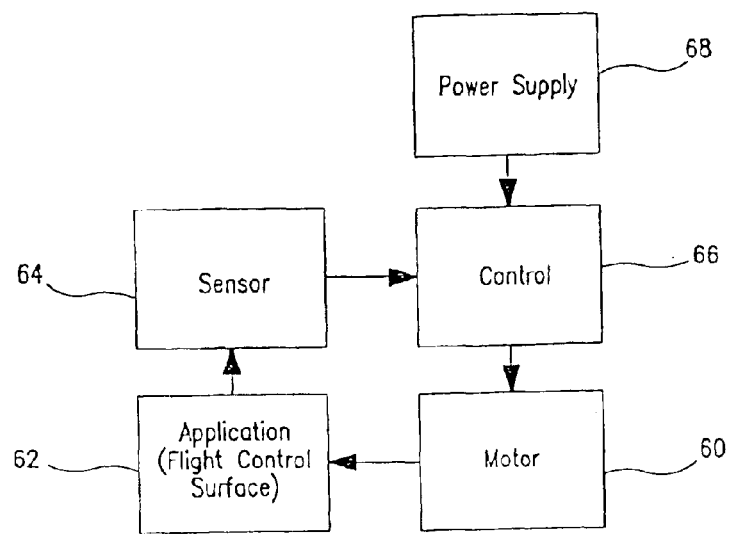
FIG. 7: illustrates in block diagram form a control scheme for actuator control application for a motor consistent with the invention.

Turning to FIG. 7 there is shown a functional block diagram identifying a control scheme for a motor consistent with the invention in an actuator application. A motor 60 consistent with the invention may include a component that is actuated by a user or machine. For example, the motor 60 may control the position of a mirror, a control surface, (such as the tail of a dart or aircraft), or a robotic surgical device. The position of the component may be sensed by potentiometers, for example, and output to a control application 62 for causing real time control of the apparatus. For example, the application may cause corresponding modification of an aircraft pitch and/or roll based on the motor position.

The modified position of the apparatus may be sensed by a sensor 64 and provided to a feedback control 66 for providing control of the motor 60 in dependence of the new position. Power supply 68 provides power to the entire system.

Figure 8:
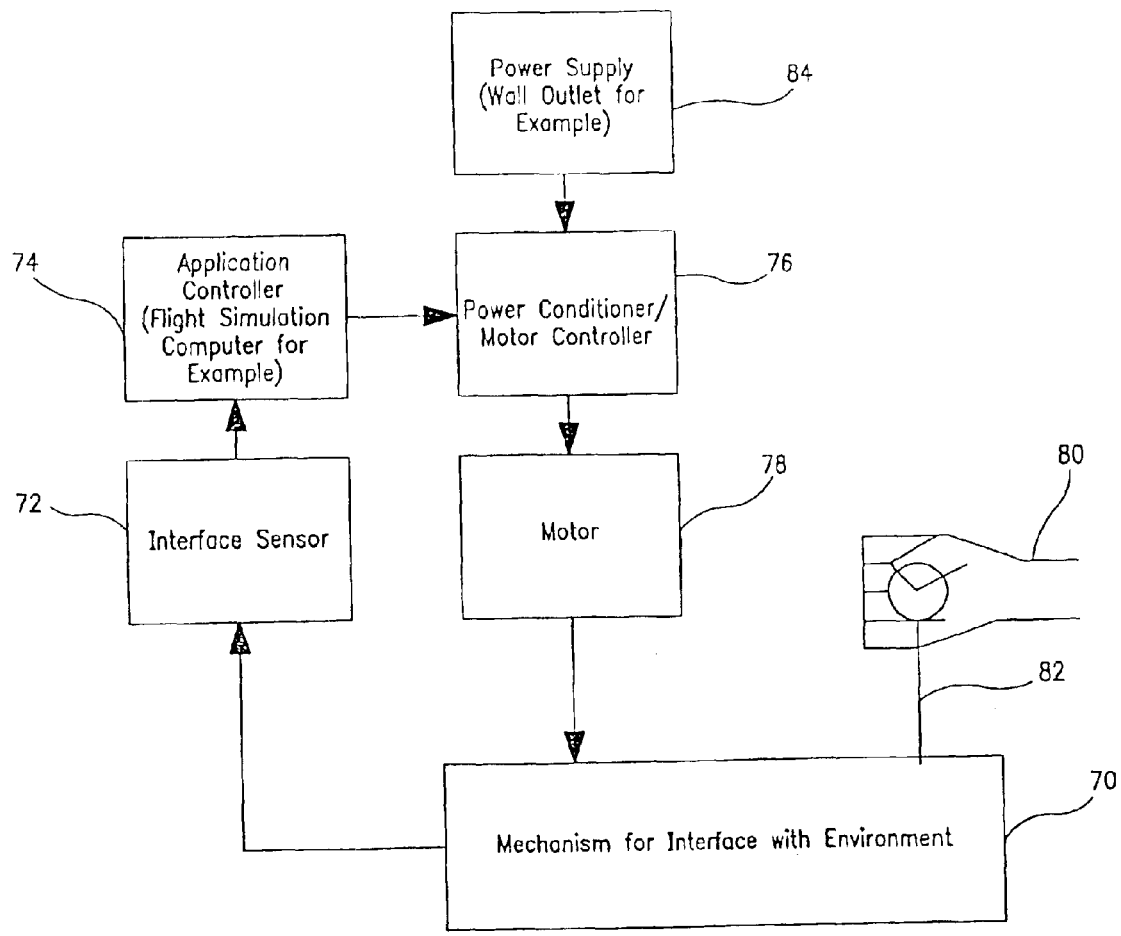
FIG. 8: illustrates in block diagram form a control scheme for a simulation control application for a motor consistent with the invention.

Turning now to FIG. 8, there is shown a control scheme for use of a motor 60 consistent with the invention in a simulator or generalized application including actual control of a device, vehicle, or aircraft. As shown, operator manipulation of a joy stick handle or other interface with the environment 70 is sensed by an interface sensor 72, which may include, for example, potentiometers for sensing rotational position of gimbals. The position sensed by sensor 72 is provided as an input to an application controller 74. The application controller may, for example, be a flight simulation computer running software for a simulation program. The output of the controller 74 is provided to a power conditioner/motor controller 76 which provides an output to a motor 78 consistent with the invention to energize the motor coils and provide an output force to the user 80 through the joystick handle 82 in the manner described above. The power supply 84 provides power to the entire system.

Figure 9:
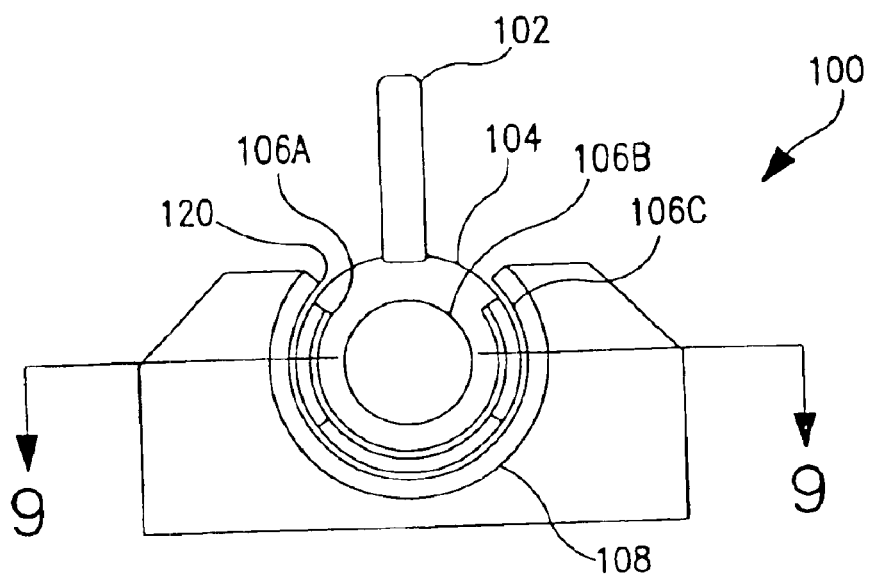
FIG. 9: is a cutaway view of a second exemplary embodiment of a motor assembly consistent with the invention.

FIG. 9 shows a cutaway view of a second embodiment motor assembly 100. In the illustrated embodiment, the assembly 100 is configured for operation as a joystick, which may provide force feedback to a user through a joystick handle 102. The joystick handle 102 is coupled to a rotor 104. The rotor 104 may be a sphere that can rotate in all directions relative to the stator 108. The rotor 104 may be configured with four permanent magnets 106A–106D arranged around the equator of the sphere. Three of these 106A, 106B, and 106C are shown in FIG. 9 and the fourth magnet 106D (see FIG. 10) is hidden behind the magnet in front. These magnets are shown circular in cross section and have curved facets in order to match the sphericity of the stator 108. The circle in the center of the sketch indicates the front facet of magnet 106B. The two curved sections on the right and left depict cutaways of magnets 106A and 106C.

The stator 108 is positioned outside of the periphery of the magnets 106A–106D. The stator 108 and the magnets 106A–106D are separated by an air gap 120.

Backiron (iron used to complete the flux path and increase the air gap field strength) is used in both the rotor 104 and the stator 108 in order to assure high performance of the motor by maximizing the magnet coupling between the stator 108 and the rotor 104.

Figure 10:
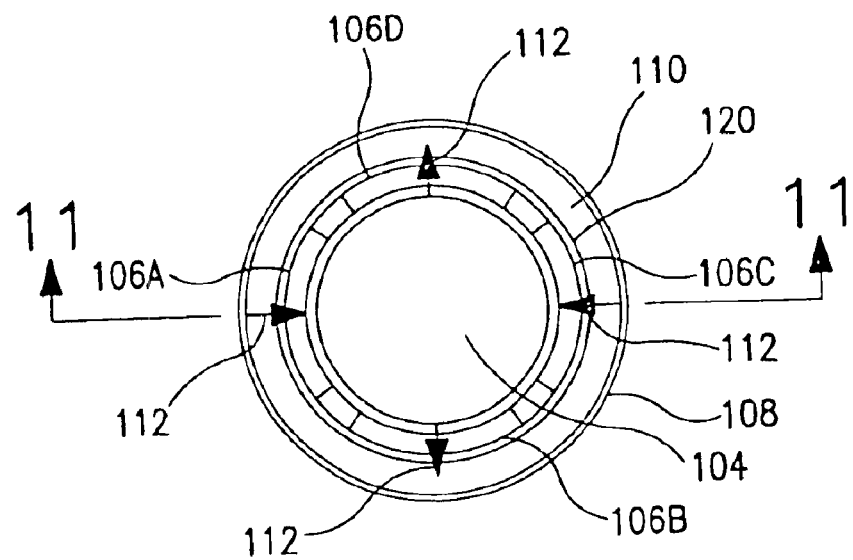
FIG. 10: is a partial top view of the motor assembly shown in FIG. 9 taken along lines 9—9.

FIG. 10 shows windings/coils 110, preferably copper, wound on the stator 108 positioned just outside the magnets 106A–D. The magnet flux 112 is generated by the permanent magnets 106A–D located on the rotor 104. The magnetic flux 112 is coupled from the permanent magnet 106A–D on the rotor 104 through the copper windings/coils 110 in the stator 108 via the backiron in the magnetic circuit with low reluctance to maximize performance.

Figure 11:
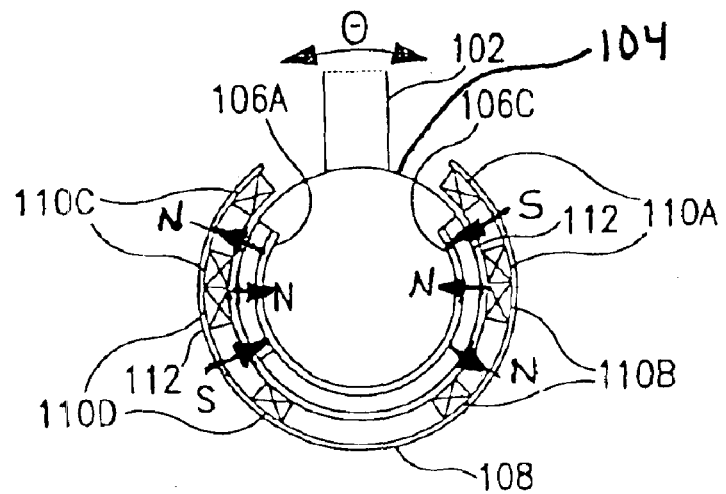
FIG. 11: is a partial sectional view of motor assembly shown in FIG. 9 taken along lines 11—11 of FIG. 10.

A magnetic circuit is shown in FIG. 11, where the coils 110A–D may be overlapped or not. This portion of the magnetic circuit is configured to provide force in the θ direction. This is achieved by energizing the four coils 110A–D shown in the picture with current of the appropriate polarity. When current is driven in these coils with the polarity shown, the interaction of the magnetic fields of the stator 108 and the rotor 104 causes the rotor 104 to be pulled in the direction that aligns the magnetic field of the magnets 106A–D with that of the coils 110A–D. As can be seen, the magnet 106A, on the left, may be pulled down towards coil 110D and pushed away from coil 110C, while the magnet 106C, on the right, may be pulled upward towards coil 110A and pushed away from coil 110B.

Figure 12:
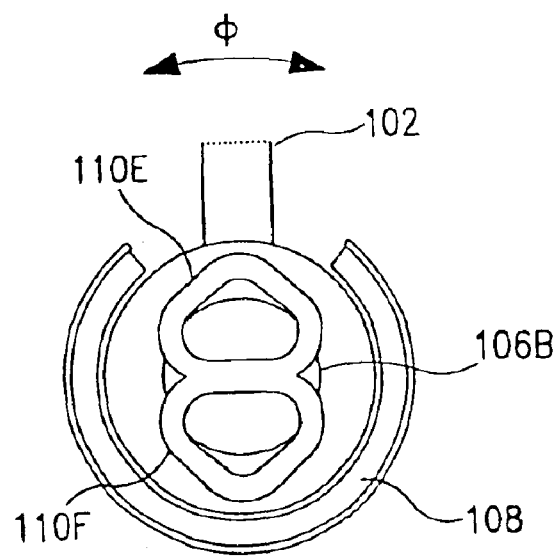
FIG. 12: is a view of motor assembly shown in FIG. 9 showing the location of copper windings.

FIG. 12 shows the magnetic circuit orthogonal to the magnetic circuit of FIG. 11. Actuation of the joystick in the Φ direction is provided by the permanent magnets 106B and 106D and windings/coils 110E–H oriented at 90° to the coils and magnets shown in FIG. 11 (permanent magnet 106D and windings/coil 110G and 110H are hidden behind the magnet and winding/coils in front).

One significant benefit of the motor configuration is a very low cross-coupling between the operation of the joystick in the two orthogonal axis, Φ and θ. This is achieved through the positioning of the four magnets at the equator of the sphere.

Figure 13:
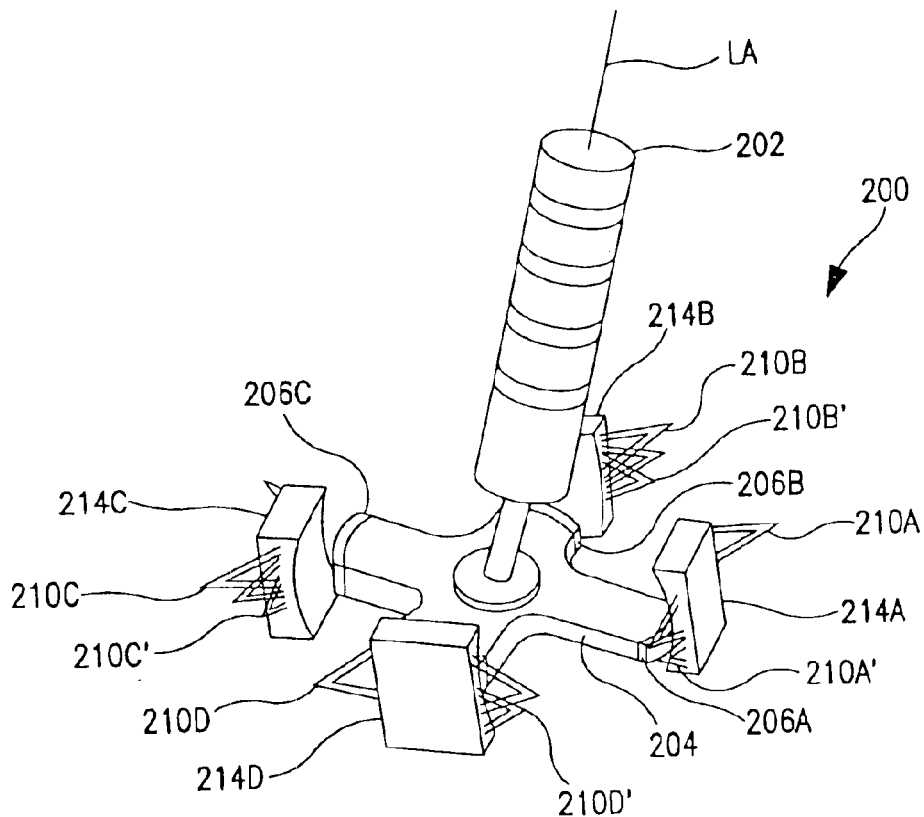
FIG. 13: is an isometric view of a third exemplary embodiment of a motor assembly consistent with the invention.
Figure 14:
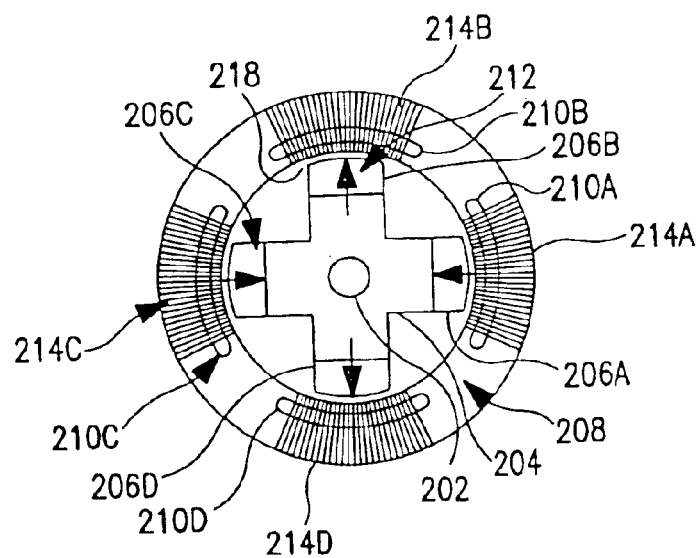
FIG. 14: is a top view of the motor assembly of FIG. 13.

FIGS. 13–15 show a four-arm motor assembly 200. The assembly 200 is configured for operation as a joystick, which may provide force feedback to a user through an output shaft 202. The output shaft 202 may also be used as an input device. The output shaft 202 may have a longitudinal axis LA that extends perpendicularly from and is fixed to a cross linkage 204. The cross linkage 204 has a first pair of diametrically opposed arms extending radially from the output shaft 202 and a second pair of diametrically opposed arms extending radially from the output shaft 202, the first arms fixed to and orthogonal to the second arms. In FIG. 13, each of four permanent magnets 206A–D is attached to one end of the cross linkage 204 (the rotor). The cross linkage 204 may be mounted to a ball joint, universal joint or gimbal at the center of the stator lamination stacks 214A–D. Each stator lamination stack 214A–D preferably has an upper copper winding 210A–D and a lower copper winding 210A'–D'. For simplicity, the end turns of the copper windings 210A–D are drawn as sharp connections. The copper windings may be controlled such that diametrically opposed winding are wired in series or in parallel. For example the upper winding 210A of stator stack 214A may be wired in series or parallel with lower winding 210C' of stator stack 214C and lower winding 210A' of stator stack 214A may be wired in series or parallel with upper winding 210C of stator stack 214C. Alternatively, each individual winding may be individually controlled.

Figure 15B:
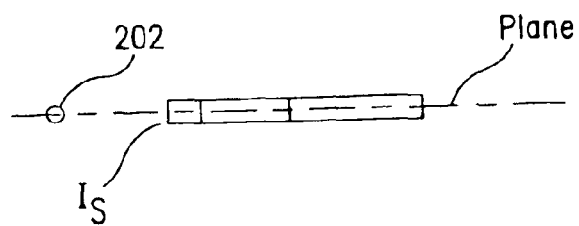
FIG. 15B is a top view of a single stator lamination of FIG. 13 having parallel sides.
Figure 15A:
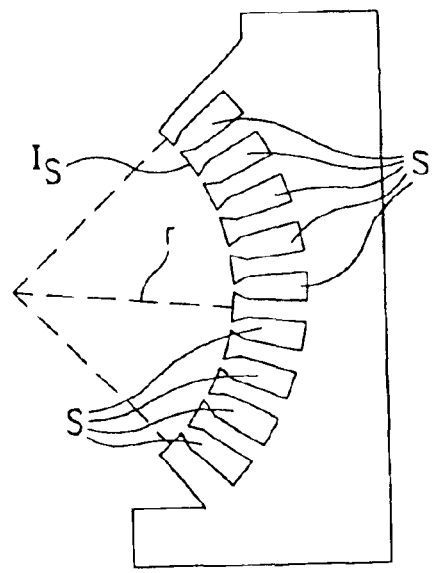
FIG. 15A is a side view of a single stator lamination of FIG. 13.

In FIG. 14, the individual stator laminations of the lamination stacks 214A–D can be seen to be oriented radially about the output shaft 202 when viewed from the top (parallel to the longitudinal axis of the output shaft 202). The laminations may comprise a pair of parallel sides, as shown in FIG. 15B. The lamination stacks may be made up of a plurality of parallel-sided laminations each separated by a spacer. The purpose of the spacer is to make the distance between adjacent laminations greater along the outside surface of the lamination stack than along the inside surface of the lamination stack. The spacer may be wedge shaped. The individual laminations may be separated by insulators. The spacer may be used to space and to insulate adjacent laminations. A plane of each lamination extends through the output shaft 202. These laminations may be all cut identically with an arcuate inner surface perpendicular to the plane of the laminations (as shown in FIG. 15A). An airgap 218 exists between the rotor and the stator of the motor. As shown, the magnetic flux generated by the permanent magnets 206A–D couples into the lamination stacks 214A–D of the stator and through the base plate 208 of the joystick. An inside surface IS of each lamination may be orthogonal to the sides surface of the lamination as shown in FIG. 15B. As used in this specification, an arcuate surface may or may not have a fixed/constant radius. The laminations may a have a plurality of radially oriented slots S.

Figure 15C:
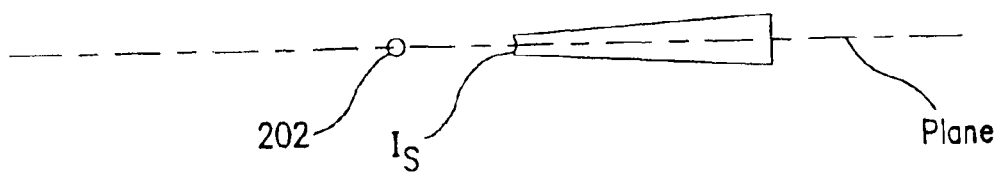
FIG. 15C is a bottom view of a single stator lamination of FIG. 13 having a wedge shape.

Alternatively, as shown in FIG. 15C, each lamination may be wedge shaped when viewed parallel to a longitudinal axis of the output shaft. In this configuration, spacers may not be required. The individual laminations may be separated by insulators. The inside surface IS of each lamination may comprise an arc when viewed parallel to a longitudinal axis of the output shaft, as shown in FIG. 15C.

The mechanical system to hold the joystick to the base may comprise one of several designs, including universal joints, ball joints, and 2 DOF gimbals. However, universal joints are preferred for use with the system due to their durability, simplicity and widespread use and availability.

A simplified drawing of a single lamination is presented in FIG. 15A. As can be seen in FIG. 15A, the slots in the laminations are also pointed radially when viewed from the side and are not parallel with each other.

By positioning these laminations radially about the output shaft 202, when viewed from the top, with all the laminations pointing towards the center of the joystick, these laminations form a spherical motor stator that maintains a constant airgap as the joystick rotor is rotated along both axes. This design provides a high performance direct drive joystick.

Figure 16:
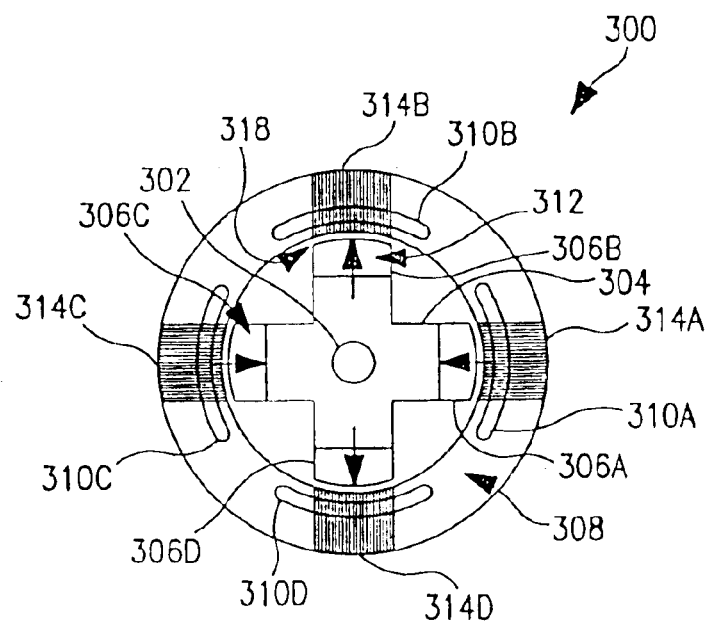
FIG. 16: is a top view of a fourth exemplary embodiment of a motor assembly consistent with the invention.

FIG. 16 shows a top view of a four-arm pseudo spherical motor assembly 300. The assembly 300 is configured for operation as a joystick, which may provide force feedback to a user through an output shaft 302. The output shaft 302 may also be used as an input device. The output shaft 302 may have a longitudinal axis that extends perpendicularly from and is fixed to a cross linkage 304. The cross linkage 304 has a first pair of diametrically opposed arms extending radially from the output shaft 302 and a second pair of diametrically opposed arms extending radially from the output shaft 302, the first arms fixed to and orthogonal to the second arms. Each of four permanent magnets 306A–D is attached to one end of the cross linkage 304 (the rotor). The cross linkage 304 may be mounted to a ball joint, universal joint or gimbal at the center of the stator lamination stacks 314A–D. Each stator lamination stack 314A–D preferably has an upper copper winding and a lower copper winding.

In this configuration, a plurality of laminations, preferably identical, are all stacked flat against each other (parallel to each other) and the laminations near the edge of the stack are disposed slightly closer to the rotor to form a stepped concave surface about the longitudinal axis of the output shaft 302 in a plane orthogonal to a side surface of the plurality of laminations. The laminations may be spaced by an insulator. The shape of the stepped concave surface of the plurality of laminations about an equator of the plurality of laminations approximates an arc having a constant radius in a plane orthogonal to a side surface of the plurality of laminations. This creates an inner stator surface that is almost the shape of a sphere. The pseudo spherical design provides advantages over the other designs in terms of manufacturing ease. The use of the laminations arranged like this results in an inner surface of the laminations that is almost, but not quite spherical (thus, the term pseudo-spherical). This maintains an airgap 318 that is almost, but not quite, constant. The assembly 300 is configured for operation as a joystick, which may provide force feedback to a user through an output shaft 302.

Note that in FIG. 16, the laminations are stacked flat against each other. The stator laminations can be seen to be oriented parallel to a line extending radially from a center point of the stator when viewed from the top. The small spaces between laminations presented in FIGS. 14 and 16 are exaggerated for illustration purposes only. Note, also, that this view contrasts with that presented in FIG. 14, where the laminations are all aligned radially. Use of this design greatly eases the manufacturing process in that the laminations can be stacked flat against each other.

Figure 17:
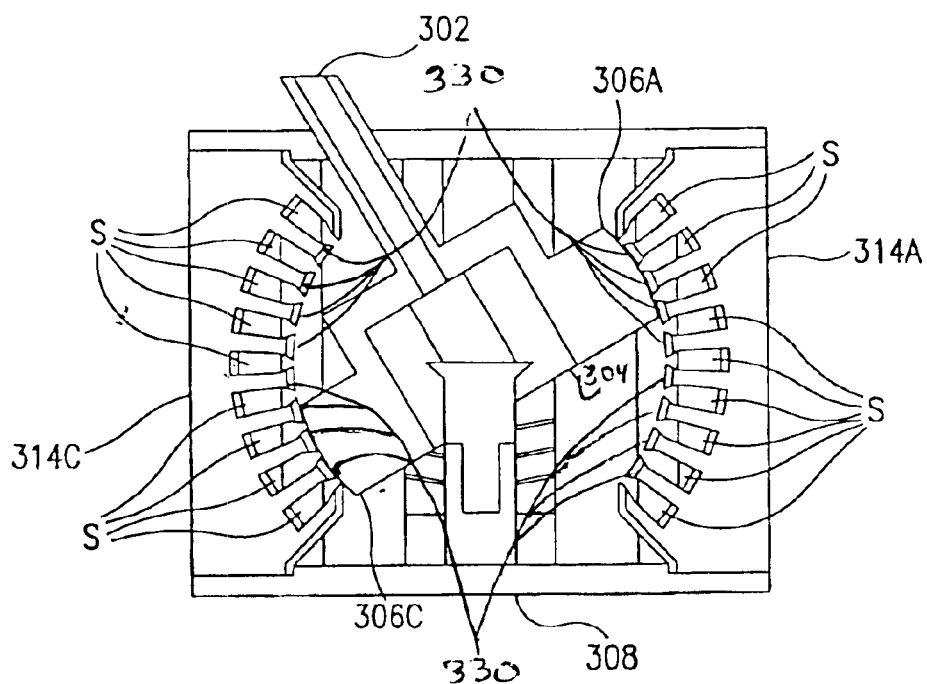
FIG. 17 is a side view of the motor assembly of FIG. 16.
Figure 18:
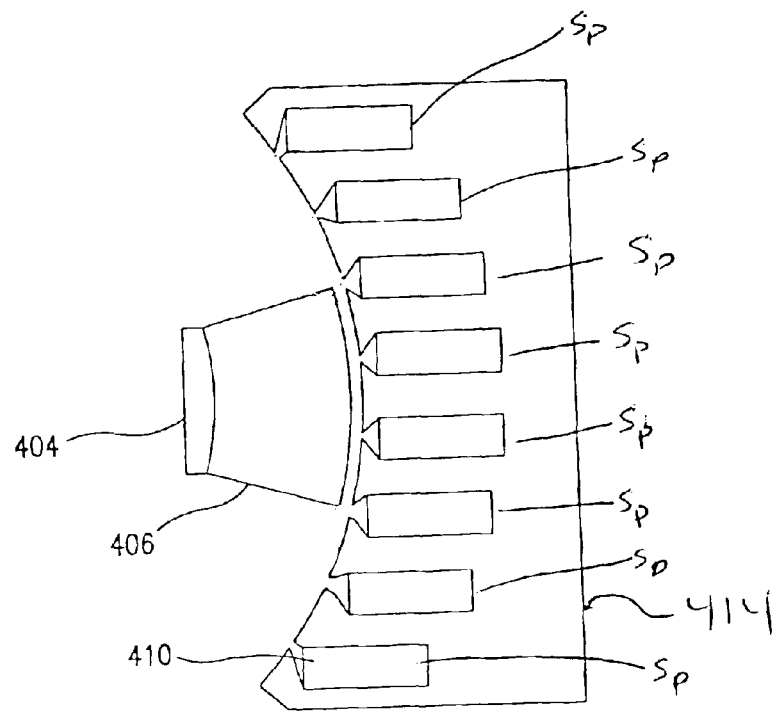
FIG. 18 is a side view of an exemplary embodiment lamination having horizontal slots.

A side view of the lamination stacks 314A–D fabricated with the pseudo spherical configuration is presented in FIG. 17. The lamination stacks 314A–D are made from a plurality of individual laminations. As can be seen in FIG. 17, the slots S in the laminations are also aligned radially when viewed from the side and are not parallel with each other. A plurality of generally uniform spreaders 330 located adjacent the arcuate surface. Spreaders are pole tips for spreading the magnetic flux in the poles more uniformly around the arcuate surface. A portion of the slots S extend between the spreaders 330. The slots extend generally radially away from the arcuate surface. The individual laminations may be symmetric about a horizontal line and adjacent spreaders 300 are generally identical. FIG. 18 is a side view of an alternative single lamination 414 spaced from a permanent magnet 406 coupled to a cross linkage 404. As shown, the slots $S_P$ cut into the lamination 414 are all parallel to each other and parallel to the stator base plate. In one embodiment, when the output shaft is in a "neutral" position, the longitudinal axis of the output shaft is perpendicular to the parallel slots. The parallel slots $S_P$ reduce the motor size and height for a given magnetic and torque performance due to the lack of angled backiron and copper windings 410. A plurality of single laminations 414 may be combined in a stack. This single lamination 414 can be used in the laminations stacks 214A–D, 314A–D shown in FIGS. 14 and 16.

Figure 19:
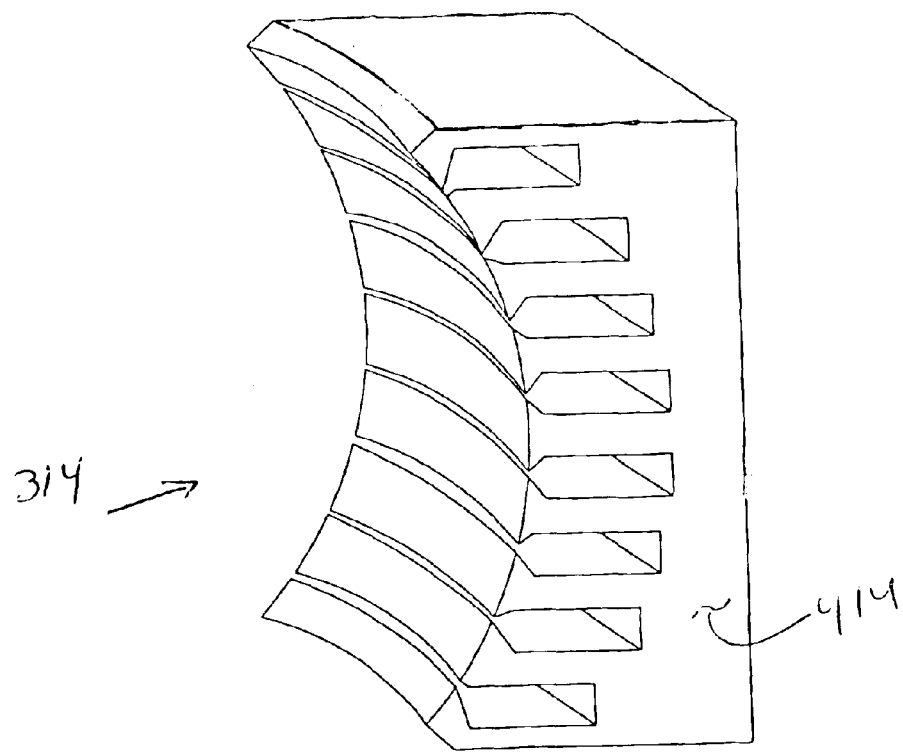
FIG. 19 is an isometric view of a plurality of the laminations of FIG. 18.
Figure 18A:
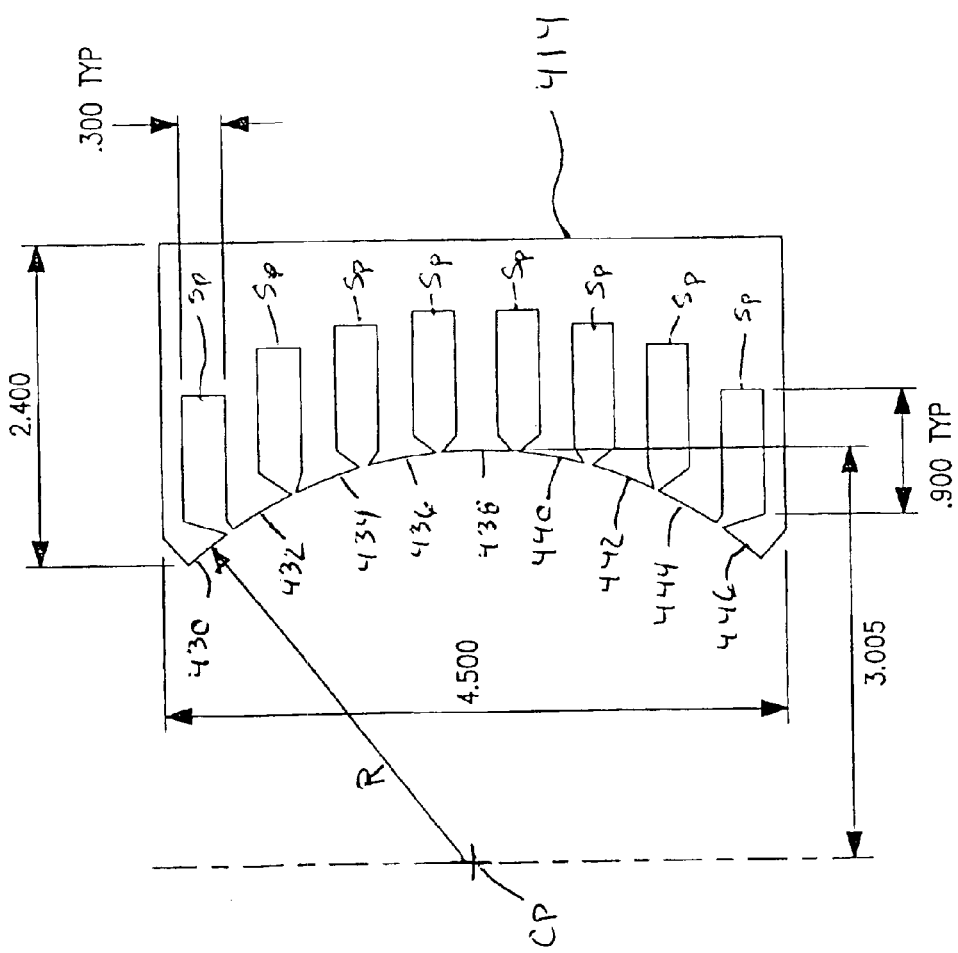
FIG. 18A is a detail drawing of the lamination of FIG. 18.
Figure 19A:
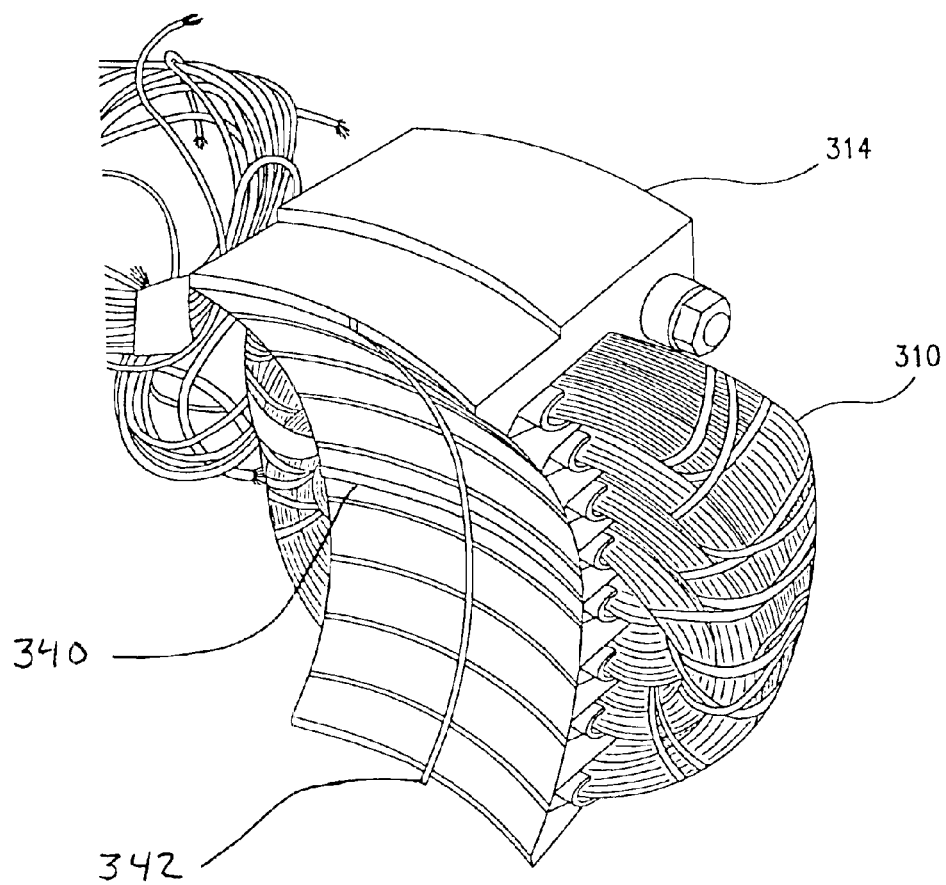
FIG. 19A is an isometric view of the plurality of laminations of FIG. 19 with windings.

FIG. 18A is detailed drawing of the single lamination 414 shown in FIG. 18. The arcuate surface of the single lamination 414 may have a fixed radius R about a center point CP. A plurality of non-uniform spreaders 430–446 located adjacent the arcuate surface help spread the magnetic field. A portion of the parallel slots $S_P$ extends between the spreaders 430–446. The slots $S_P$ extend away from the arcuate surface generally parallel to the base of the laminations. The individual laminations 414 may be symmetric about a horizontal line, but adjacent spreaders are generally not identical. A drawing of a 3D model of the lamination stack 314 with a plurality of laminations 414 with the horizontal slots and a pseudo spherical configuration is presented in FIG. 19. An isometric view of the plurality of laminations of FIG. 19 along with windings is shown in FIG. 19A. When the laminations are formed into a stack 314 as shown in FIG. 19, the individual laminations may be arranged about a center point of the rotor such that the arcuate surface of the lamination stack is equally spaced from the center point of the rotor. The stack 314 has an equatorial arc 340 and a longitudinal arc 342. The radius of the equatorial arc 340 being generally equal to the radius of the longitudinal arc 342.

Figure 20A:
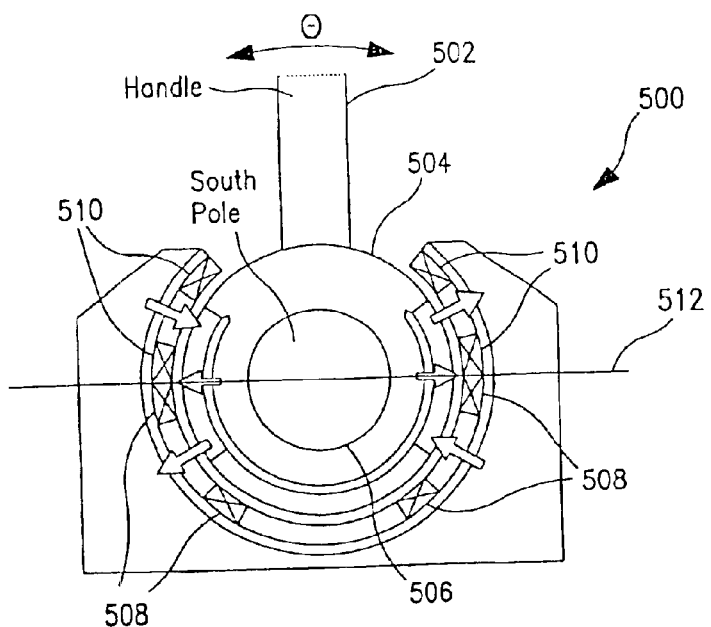
FIG. 20A is a side sectional view of a fifth exemplary embodiment of a motor assembly consistent with the invention.
Figure 20B:
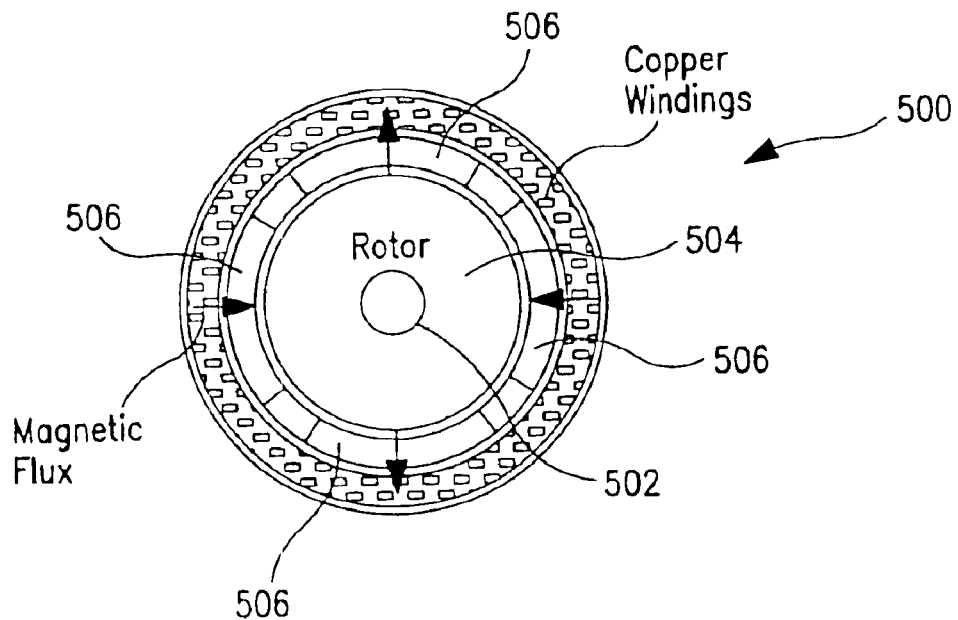
FIG. 20B is a top view of the motor assembly of FIG. 20A.

Further details of the invention are illustrated in FIGS. 20A–20F. FIG. 20A shows a side sectional view and FIG. 20B is a top view of a motor assembly 500. The assembly 500 has eight coils 506, 508 positioned around an equator 510 (as shown in FIG. 20A) of a rotor 504. A first set of four upper coils 506 may be centered on a "tropic of cancer" and a second set of lower four coils 508 may be centered on a "tropic of capricorn". The upper coils 506 and the lower coils 508 are permanently located. The upper and lower coils 506 and 508 do not have to be located within 23° of the equator 510. A handle 502 may be coupled to the rotor 504 to operate as a joystick. The joystick may be used as an input device and may also provide force feedback to a user. In one embodiment the upper coils 506 and lower coils 508 are similar in size (same wire gauge and number of turns); in a second embodiment the upper coils 506 may be smaller in size than the lower coils 508; and, in a third embodiment the upper coils may be absent with all the force feedback being provided by the lower coils 508. Alternatively, the lower coils 508 could be smaller than the upper coils 506 or absent with all the force feedback being provided by the upper coils 506.

Figure 20C:
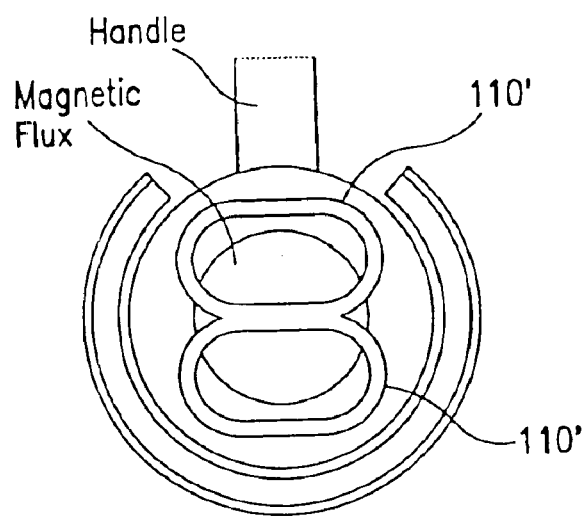
FIG. 20C is a side view of the motor assembly of FIG. 20A with a first winding configuration.
Figure 20D:
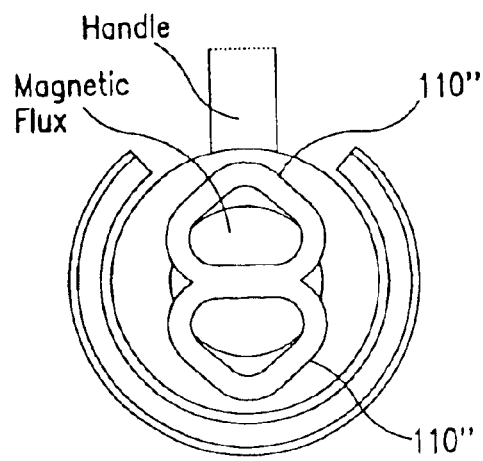
FIG. 20D is a side view of the motor assembly of FIG. 20A with a second winding configuration.
Figure 20E:
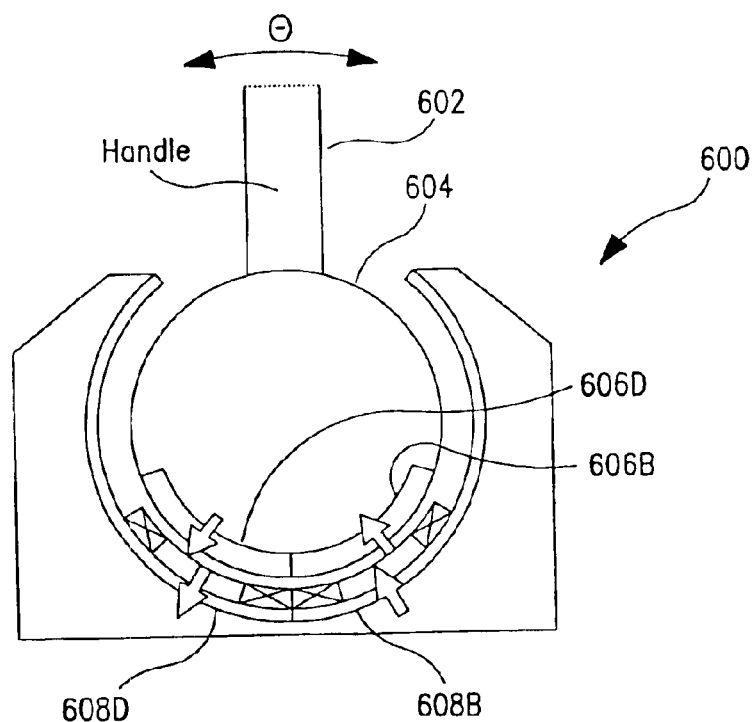
FIG. 20E is side section view of a sixth embodiment motor assembly consistent with the invention.
Figure 20F:
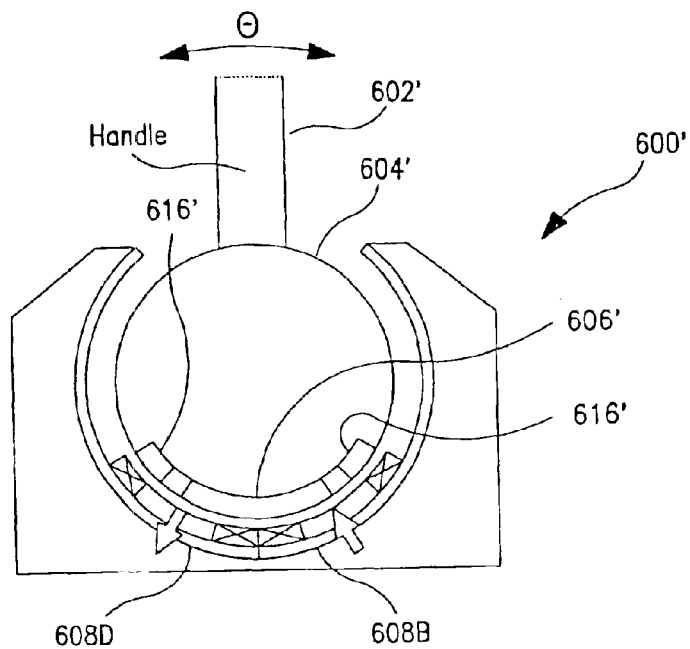
FIG. 20F is side section view of a seventh embodiment motor assembly consistent with the invention.
Figure 20G:
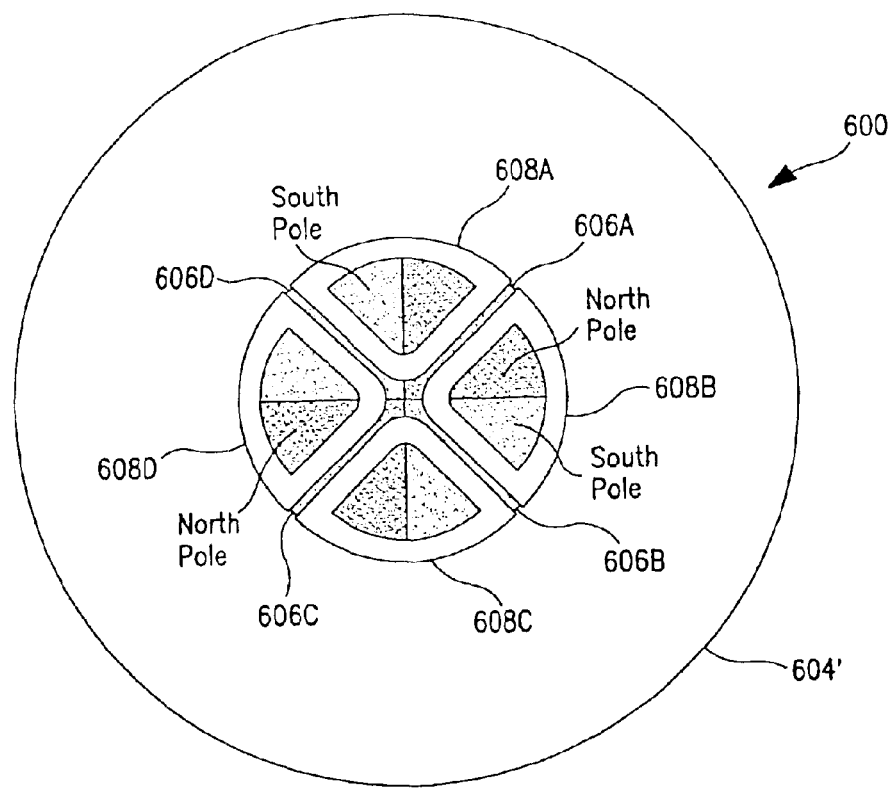
FIG. 20G is a bottom view of the motor assembly of FIG. 20E.
Figure 20H:
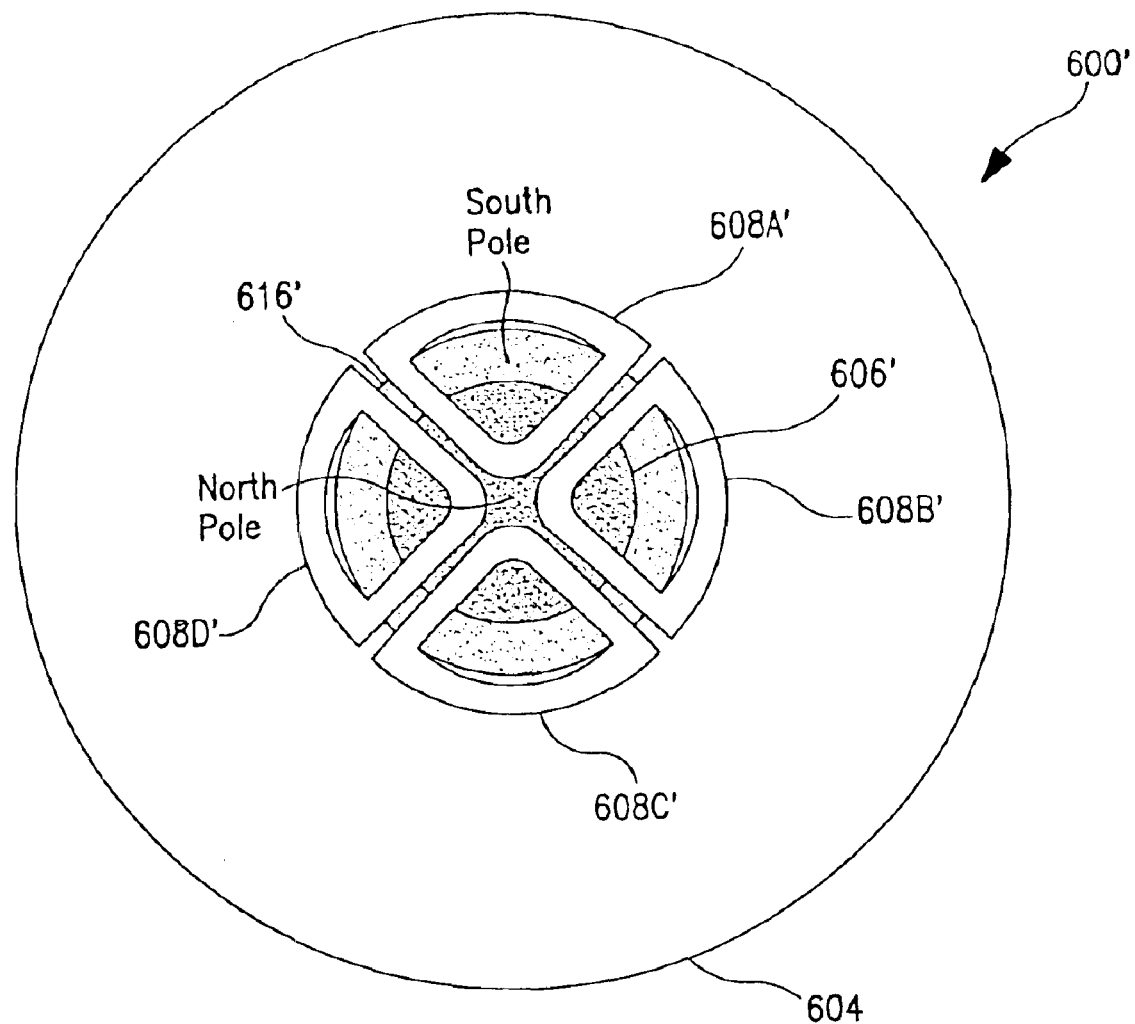
FIG. 20H is a bottom view of the motor assembly of FIG. 20F.

FIGS. 20C and 20D show that the winding may be formed in different configurations depending on the intended application. Winding 510 as shown in FIG. 20C is somewhat oblong and the winding 510' as shown in FIG. 20D is somewhat triangular. Other winding configurations will work. FIGS. 20E and 20F are side sectional views of a motor assembly 600 and 600' and FIGS. 20G and 20H show a bottom view of the motor assemblies 600 and 600' respectively. FIGS. 20E and 20G show four coils 608A–D disposed about a plurality of permanent magnets 606A–D centered on an "Antarctic circle". The coils 608A–D are shown rotated 90° about the longitudinal axis of the out put shaft relative to the permanent magnets 606A–D. Upon energization of coil 608B or 608D, a first magnetic field is established to urge the rotor to rotate in the θ direction, a first degree of freedom. Upon energization of coil 608A or 608C, a second magnetic field is established to urge the rotor to rotate orthogonal to the θ direction, a second degree of freedom.

FIG. 20F shows a pair of concentric permanent magnets 606' and 616' centered on an "Antarctic circle". FIG. 20H shows four coils 608A–'D' disposed about the concentric permanent magnets 606' and 616'.

The permanent magnets 606A–D, 606' and 616' and the coils 608A–D and 608 A'–D' maybe combined with the motor assembly 500, shown in FIGS. 20A and 20B, to provide auxiliary output force to the handle 602 coupled to the rotor 604. Alternatively, the magnets 606A–D, 606' and 616' and the coils 608A–D and 608A'–D' may be used as an input device for detecting movement of the handle 602 and 602'. The magnet 608 does not have to be positioned directly opposite the handle 602 for proper operation.

Figure 21:
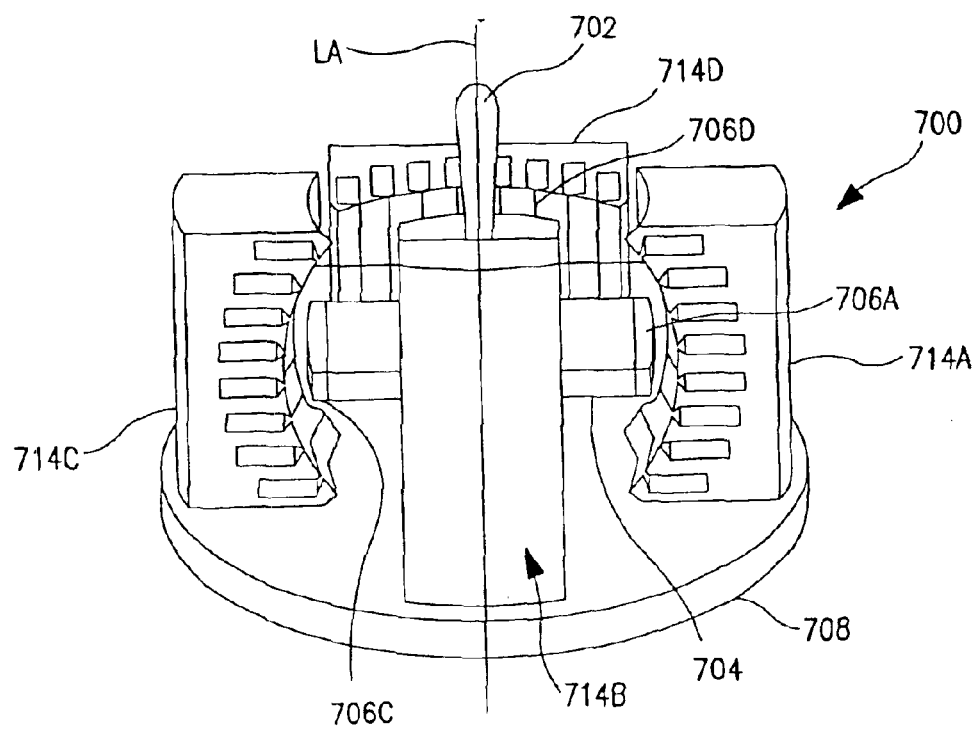
FIG. 21 is a perspective view of an eighth embodiment motor assembly consistent with the invention.

FIG. 21 shows an eighth embodiment motor assembly 700. The motor assembly 700 may comprise a stator comprising a plurality of lamination stacks 714A, 714B, 714C and 714D and a rotor 704. An output shaft 702 may be coupled to the rotor 704. The rotor 704 may comprise a cross linkage having a first arm and a second arm. The output shaft 702 may be fixed orthogonally to the cross linkage of the rotor 704. The first arm and the second arm may each have first and second distal ends that may be radially spaced from the centrally positioned output shaft 702. The first arm may be orthogonal to the second arm. A permanent magnet 706A–D may be disposed at distal ends of the first arm and the second arm.

Each lamination stack 714A–D may comprise an interior surface and a first and a second stator coil wound in close proximity to the interior surface. Each of the permanent magnets 706A–D may be spaced by an air gap from the interior surface of an associated lamination stack 714A–D. The lamination stacks 714A–D may be disposed about the longitudinal axis LA of the output shaft 702. One or more of the lamination stacks 714A–D may be oriented relative to the longitudinal axis LA of the output shaft 702. As shown in FIG. 21, the lamination stack 714D may be oriented such that a plane formed by a lamination in the lamination stack 714D forms an angle with the longitudinal axis of the output shaft 702. The angle is shown as being substantially 90°, but any angle relative to the longitudinal axis of the output shaft is conceivable. Lamination stack 714B may be oriented such that a plane formed by a lamination in the lamination stack 714B is substantially parallel with the longitudinal axis of the output shaft. Lamination stack 714B and 714D may be diametrically opposed. Lamination stacks 714A and 714C may also be oriented such that a plane formed by a lamination in the lamination stacks 714A and 714C respectively are substantially parallel with the longitudinal axis of the output shaft 702 or they may be oriented such that that a plane formed by a lamination in the lamination stacks 714A and 714C form a first and a second angle with the longitudinal axis of the output shaft 702. The first and the second angle may be the same or may be different.

The stator coils in each of the lamination stacks 714A–D, when energized, urge the associated permanent magnet to rotate in a plane parallel to a plane formed by a lamination in the associated lamination stack. The stator coils in lamination stack 714D, when energized, urge the output shaft 702 to rotate about the longitudinal axis of the output shaft 702, thereby creating a first degree of freedom. The stator coils in lamination 714B, when energized, urge the output shaft 702 to rotate in a plane parallel to a plane formed by a lamination in lamination stack 714B, thereby creating a second degree of freedom. Likewise, the stator coils in lamination stack 714A and lamination stack 714C, when energized, urge the output shaft 702 to rotate in a plane parallel to a lamination in lamination stacks 714A and 714C respectively thereby creating a third degree of freedom.

Figure 22:
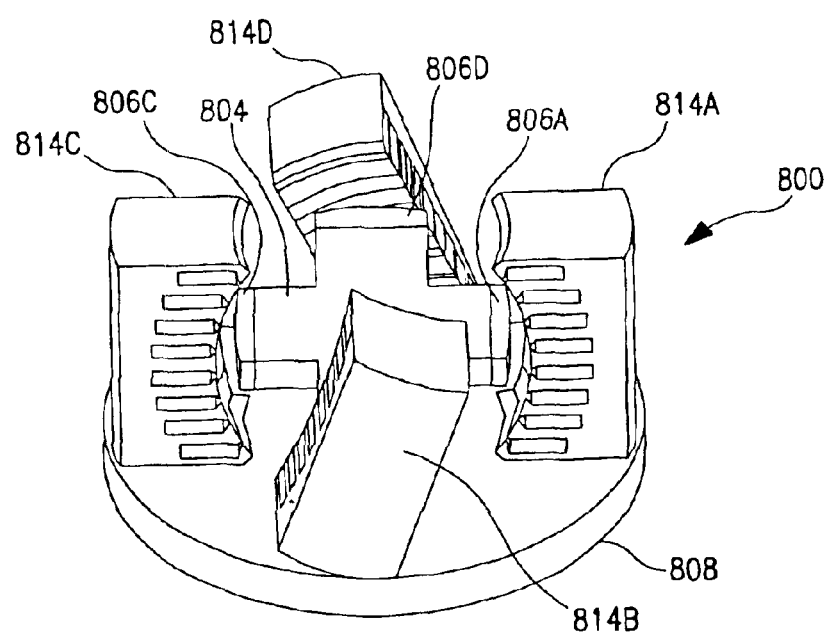
FIG. 22 is a perspective view of a ninth embodiment motor assembly consistent with the invention.
Figure 23:
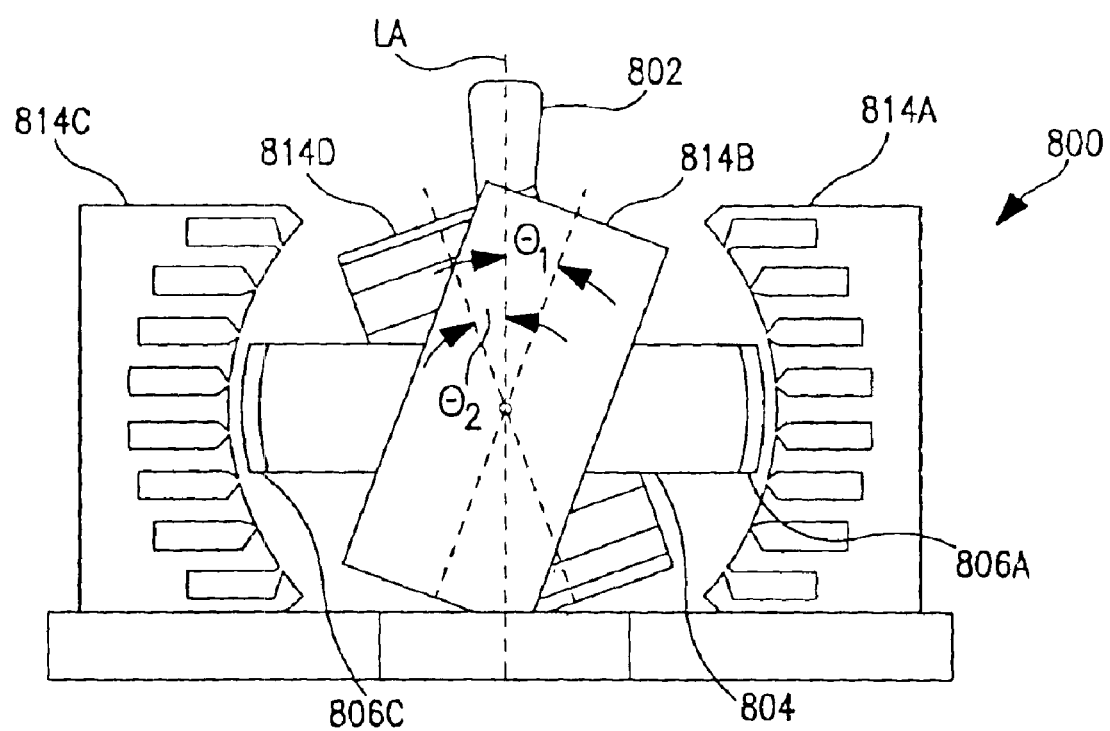
FIG. 23 is a side view of the motor assembly of FIG. 21.

FIGS. 22 and 23 show a perspective view and side view respectively of a ninth motor assembly 800. The motor assembly may comprise a stator comprising a plurality of lamination stacks 814A, 814B, 814C and 814D and a rotor 804. An output shaft 802 may be coupled to the rotor 804. The rotor 804 may comprise a cross linkage having a first arm and a second arm. The output shaft 802 may be fixed orthogonally to the cross linkage of the rotor 804. The first arm and the second arm may each have first and second distal ends that may be radially spaced from the centrally positioned output shaft 802. The first arm may be orthogonal to the second arm. A permanent magnet 806A–D may be disposed at distal ends of the first arm and the second arm.

Each lamination stack 814A–D may comprise an interior surface and a first and a second stator coil wound in close proximity to the interior surface. Each of the permanent magnets 806A–D may be spaced by an air gap from the interior surface of an associated lamination stack 814A–D. The lamination stacks 814A–D may be disposed about the longitudinal axis LA of the output shaft 802. One or more of the lamination stacks 814A–D may be oriented relative to the longitudinal axis LA of the output shaft 802.

As shown in FIG. 23, the lamination stack 814D may be oriented such that a plane formed by a lamination in the lamination stack 814D forms an angle $\theta_2$ with the longitudinal axis of the output shaft 802. The angle $\theta_2$ may be between about 5° and about 85°. Preferably, the angle $\theta_2$ is between 15° and 75°, and most preferably the angle is between 30° and 60°. Lamination stack 814B may be oriented such that a plane formed by a lamination in the lamination stack 814B forms an angle $\theta_1$ with the longitudinal axis of the output shaft 802. Lamination stack 814B and 814D may be diametrically opposed. Angle $\theta_1$ and $\theta_2$ may be the same or may be different. Lamination stacks 814A and 814C may be oriented such that a plane formed by a lamination in the lamination stacks 814A form an angle $\theta_3$ and $\theta_4$ (not shown) respectively with the longitudinal axis of the output shaft 802 or may also be oriented such that a plane formed by a lamination in the lamination stacks 714A and 714C are substantially parallel with the longitudinal axis of the output shaft 802. Lamination stack 714A and 714C may be diametrically opposed. Angles $\theta_3$ and $\theta_4$ may be the same or may be different.

The stator coils in each of the lamination stacks 814A–D, when energized, urge the associated permanent magnet to rotate in a plane parallel to a plane formed by a single lamination in the associated lamination stack. The stator coils in lamination stack 814D, when energized, urge the output shaft 702 to rotate in a plane at an angle $\theta_2$ with the longitudinal axis of the output shaft 802, thereby creating a first degree of freedom. The stator coils in lamination 814B, when energized, urge the output shaft 802 to rotate in a plane at an angle $\theta_1$ with the longitudinal axis, thereby creating a second degree of freedom. Likewise, the stator coils in lamination stack 814A and lamination stack 814C, when energized, urge the output shaft 702 to rotate in a plane at an angle at an angle $\theta_3$ and at an angle $\theta_4$ with the longitudinal axis thereby creating a third degree of freedom.

There is thus provided a motor that is capable of providing output in multiple degrees of freedom. The motor is simple and efficient in design and can be adapted for a variety of applications including joystick applications. The motor includes substantially orthogonally arranged stator coils wound thereon. A rotor including a plurality of magnets is provided adjacent the stator. The rotor may be provided at the end of an output shaft that is pivotally disposed relative to the stator for pivotal movement upon energization of the stator coils.

The embodiments described herein, however, are but some of the several which utilize this invention and are set forth here by way of illustration but not of limitation. For example, although a motor consistent with the invention can provide output in multiple degrees of freedom, it would be possible to operate the motor in only one degree of freedom by providing or energizing only a single coil. Another example of use of the invention is replacement of the joystick with a mirror; the mirror can then be tilted in two degrees of freedom for scanning or alignment purposes. Also, a wide variety of gimbal arrangements may be provided for pivotally supporting the stick to maintain an air gap between the stator and rotor. Yet other embodiments may be made without departing materially from the spirit and scope of the invention as defined in the appended claims.

What is claimed is:

1. A motor having an output shaft movable in multiple degrees of freedom, the motor comprising:
   a stator having an interior curved surface;
   a first stator coil and a second stator coil wound in close proximity to the interior surface, but not extending inward of the interior curved surface, the first stator coil and the second stator coil positioned substantially orthogonally to each other; and
   a rotor fixed to the output shaft and movably supported adjacent the interior surface of the stator with an air gap disposed between the rotor and the stator, the rotor including at least one magnet disposed thereon and being movable along the interior surface in directions defining at least a first and a second degree of freedom; wherein upon energization of the first stator coil a first magnetic field is established to urge the rotor to rotate in a direction of the first degree of freedom, and upon energization of the second stator coil a second magnetic field is established to urge the rotor to rotate in a direction of the second degree of freedom, the second degree of freedom substantially perpendicular to the first degree of freedom.

2. The motor of claim 1, wherein the first degree of freedom is substantially perpendicular to a longitudinal axis of wires of one of the first and second coils associated with the first degree of freedom and the second degree of freedom is substantially perpendicular to a longitudinal axis of wires of the other of the first and second coils.

3. The motor of claim 1, wherein the curved interior surface is defined by a stator back iron comprising a ferromagnetic material.

4. The motor of claim 1, wherein the interior curved surface defines at least a portion of a sphere.

5. The motor of claim 1, wherein the curved interior surface is uniformly curved.

6. The motor of claim 1, wherein the at least one magnet is a permanent magnet.

7. The motor of claim 1, wherein the rotor includes a plurality of the magnets disposed thereon, and wherein each of the plurality of magnets forms a different side of a parallelogram with first and third ones of the magnets defining a first pair of parallel sides of the parallelogram which are substantially parallel to the first stator coil, and second and fourth ones of the magnets defining a second pair of parallel sides of the parallelogram which are substantially parallel to the second stator coil.

8. The motor of claim 7, wherein the parallelogram is a square.

9. The motor of claim 7, wherein the first and second ones of the magnets are configured with south poles disposed adjacent the stator coils and the third and fourth ones of the magnets are configured with north poles disposed adjacent the stator coils.

10. The motor of claim 1, wherein the rotor is supported adjacent the stator by a gimbal mechanism connected to the output shaft and supported on the stator.

11. The motor of claim 10, wherein the gimbal mechanism is configured to establish pivot points for the output shaft to allow motion of the rotor in the first and second degrees for freedom, the pivot points being aligned with an equator of the curved surface.

12. The motor of claim 1, wherein the output shaft is additionally an input shaft.

13. The motor of claim 12, further comprising a sensor for detecting movement of the input shaft.

14. A motor having an output shaft movable in multiple degrees of freedom, the motor comprising:
   a stator, the stator having an interior surface and first and second stator coils wound in close proximity to the interior surface, the stator coils positioned substantially orthogonally to each other, the stator comprising a plurality of laminations, the laminations radially disposed about a center point with a plane of each lamination extending through the center point; and
   a rotor fixed to the output shaft and movably supported adjacent the stator with an air gap disposed between the rotor and the stator, the rotor including at least one magnet disposed thereon and being movable along the interior surface in directions defining at least first and second degrees of freedom.

15. The motor of claim 14, whereupon energization of the first stator coil a first magnetic field is established to urge the output shaft to rotate in a first plane, and upon energization of the second stator coil a second magnetic field is established to urge the output shaft to rotate in a second plane substantially orthogonal to the first.

16. The motor of claim 14, wherein each lamination comprises an arcuate surface perpendicular to the plane of the lamination.

17. The motor of claim 14, wherein each lamination comprises a wedge shape when viewed parallel to a longitudinal axis of the output shaft.

18. The motor claim of claim 14, wherein each lamination comprises a pair of parallel sides.

19. The motor claim of claim 18, wherein the laminations are separated by spacers to space the laminations more along an outside surface of the stator than along the interior surface of the stator.

20. The motor of claim 14, wherein the output shaft is additionally an input shaft.

21. The motor of claim 18, further comprising a sensor for detecting movement of the input shaft.

22. A motor having an output shaft movable in multiple degrees of freedom, the motor comprising:
   a first stator, the first stator having an interior curved surface and a first stator coil, a second stator coil, and a third stator coil, the stator coils wound in close proximity to the interior surface;
   a second stator, the second stator having an interior curved surface and a fourth stator coil, a fifth stator coil, and a sixth stator coil, the stator coils wound in close proximity to the interior surface;
   a commutation system capable of changing the distribution of current in the first, second, third, fourth, fifth, and sixth coils to provide a desired force at each output shaft position; and a rotor fixed to the output shaft and movably supported adjacent the first stator and the second stator with an air gap disposed between the rotor and the stators, the rotor including at least one magnet disposed thereon and being movable along the interior surfaces in directions defining at least first, second, and third degrees of freedom, each degree of freedom substantially perpendicular to the other degrees of freedom, wherein energization of at least one of the stator coils is capable of urging the rotor along any of the degrees of freedom.

23. The motor of claim 22, wherein the first stator is positioned substantially perpendicular to the second stator.

24. The motor of claim 23, wherein upon energization of one or more of the first, second, or third stator coils a first magnetic field is established to urge the rotor to rotate in a direction of the first degree of freedom, and upon energization of one or more of the fourth, fifth, or sixth stator coils a second magnetic field is established to urge the rotor to rotate in a direction of the second degree of freedom, the second degree of freedom substantially perpendicular to the first degree of freedom.

25. The motor of claim 22, wherein the output shaft is additionally an input shaft.

26. The motor of claim 25, further comprising a sensor for detecting movement of the input shaft.

27. The motor of claim 22, wherein the first stator comprises a first plurality of parallel laminations and the second stator comprises a second plurality of parallel laminations positioned in an arc about a center point, the first plurality arranged perpendicular to the second plurality.

28. The motor of claim 27, wherein each lamination comprises a plurality of parallel slots.

29. The motor of claim 28, wherein all of the parallel slots are perpendicular to a longitudinal axis of the output shaft when the output shaft is in a neutral position.

30. The motor of claim 27, wherein the first and second plurality of laminations comprise a plurality of identical laminations.

31. The motor of claim 27, wherein each lamination comprises an interior surface having an arcuate face, the arcuate face being orthogonal to a side surface of each lamination.

32. The motor of claim 27, wherein the first plurality of parallel laminations forms a stepped concave surface about a longitudinal axis of the output shaft in a plane orthogonal to the side surface of the plurality of laminations.

33. The motor of claim 22, wherein the first, second, and third coils are wound around the stator such that they overlap each other.

34. The motor of claim 22, wherein the first, second, and third coils are coupled to and driven by a poly-phase power supply.

35. A ferromagnetic lamination for use in a stator, comprising:
an arcuate surface orthogonal to a side surface;
a plurality of non-uniform spreaders adjacent the arcuate surface; and
a plurality of slots extending from the spreaders away from the arcuate surface.

36. The ferromagnetic lamination of claim 35, wherein each of the slots are parallel to each other.

37. The ferromagnetic lamination of claim 35, wherein the arcuate surface conforms to a partial semi-circle having a center point.

38. The ferromagnetic lamination of claim 37, wherein each of the slots are aligned along a radial axis extending through the center point.

39. A motor having an output shaft movable in multiple degrees of freedom, the motor comprising:
a first stator portion and a second stator portion, each stator portion having a plurality of laminations, each lamination having an arcuate surface orthogonal to a side surface, a plurality of non-uniform spreaders adjacent the arcuate surface, and a plurality of slots extending from the spreaders away from the arcuate surface, each stator portion having a coil wound in close proximity to the arcuate surface, the first stator portion positioned substantially orthogonal to the second stator portion; and
a rotor fixed to the output shaft and movably supported adjacent the stator with an air gap disposed between the rotor and the stator, the rotor including at least one magnet disposed thereon and being movable along the interior surface in directions defining at least first and second degrees of freedom, wherein upon energization of the first stator coil a first magnetic field is established to urge the rotor to rotate in a direction of the first degree of freedom, and upon energization of the second stator coil a second magnetic field is established to urge the rotor to rotate in a direction of the second degree of freedom, the second degree of freedom substantially perpendicular to the first degree of freedom.

40. The motor of claim 39, wherein each of the laminations in the first stator portion are parallel to each other.

41. The motor of claim 39, wherein the laminations are radially disposed about a center point with a plane of each lamination extending through the center point.

42. A method of providing force feedback to an output shaft of a motor, comprising the steps of:
providing a first stator having a first interior curved surface and a first, a second, and a third stator coil wound in close proximity to the first interior surface, the first, the second, and the third stator coils overlapping each other;
providing a rotor fixed to the output shaft and movably supported adjacent the first interior surface of the first stator with an air gap disposed between the rotor and the first stator, the rotor being movable along the interior surfaces in a direction defining a first degree of freedom; and
energizing at least one of the first, the second, and the third stator coils to urge the rotor to rotate in a direction of a first degree of freedom.

43. The method of claim 42, further comprising the step of energizing at least two of the first, the second, and the third stator coils to urge the rotor to rotate in a direction of the first degree of freedom.

44. The method of claim 42, changing a distribution of current in the first, second, and third stator coils to provide a desired force at each output shaft position.

45. The method of claim 42, further comprising the step of providing a second stator having a second interior curved surface and a fourth, a fifth, and a sixth stator coil wound in close proximity to the interior surface of the second stator.

46. The method of claim 45, further comprising the step of energizing at least two of the fourth, fifth, and the sixth stator coils to urge the rotor to rotate in a direction of a second degree of freedom.

47. The method of claim 45, further comprising the step of changing a distribution of current in the fourth, fifth, and the sixth stator coils to provide a desired force at each output shaft position.

* * * * *